United States Patent [19]
Rockwell, III

[11] Patent Number: 5,748,825
[45] Date of Patent: May 5, 1998

[54] LIQUID CRYSTAL OPTICAL WAVEGUIDE DISPLAY SYSTEM

[76] Inventor: Marshall A. Rockwell, III, 303 Grenola St., Pacific Palisades, Calif. 90272

[21] Appl. No.: 379,519
[22] PCT Filed: Aug. 3, 1992
[86] PCT No.: PCT/US92/06418
  § 371 Date: Mar. 27, 1995
  § 102(e) Date: Mar. 27, 1995
[51] Int. Cl.⁶ ................................................. G02B 6/02
[52] U.S. Cl. ................................................. 385/126
[58] Field of Search ................................. 385/122, 125, 385/126

[56] References Cited

U.S. PATENT DOCUMENTS

| | | | |
|---|---|---|---|
| 4,974,942 | 12/1990 | Gross et al. | 350/347 |
| 5,009,483 | 4/1991 | Rockwell, III | 350/96.24 |

FOREIGN PATENT DOCUMENTS

| | | |
|---|---|---|
| 0278038 A1 | 2/1987 | European Pat. Off. |
| 0278038 | 8/1988 | European Pat. Off. |
| PCT/GB84/ 00166 | 4/1984 | WIPO |
| 8404601 | 11/1984 | WIPO |

*Primary Examiner*—Akm E. Ullah
*Attorney, Agent, or Firm*—Cooley Godward LLP

[57] ABSTRACT

A controllable waveguide display based on a cladding (3), supercladding (1 and 6) and/or core (4) utilizing liquid crystals is described. An electric field applied through a fiber causes the liquid crystal layer to become aligned. Changes in the refractive index of the liquid crystal layer causes light to switch out of the fiber. In one embodiment light is coupled into a supercladding (6) running alongside the core and reflected out of the fiber at a reflector pit (35) cut in the fiber. Parallel arrays of fibers are used to cover a substrate and make large viewing screens. A tapered supercladding (6) helps improve the contrast ratio of screens using fiber taps. A thin cladding (3) and closely spaced dark cladding (2) also help improve the screen contrast ratio. Color techniques based on a three core fiber that shares a single supercladding (1) is introduced. An illumination method is also taught which breaks white light into colored components (73) with dielectric filters (103) to efficiently utilize white light (102). An electronic feed-back system (96) is introduced which provides screen brightness and color uniformity under varying temperature and environmental conditions.

11 Claims, 11 Drawing Sheets

LIQUID CRYSTAL OPTICAL WAVEGUIDE DISPLAY SYSTEM

BACKGROUND OF THE INVENTION

1. Field of the Invention

The invention relates to large area, thin-panel, video screens. More particularly, this patent teaches improvements in the field of optical waveguide displays. Specifically, techniques for tapping light out of optical fibers with a liquid crystal switching element are described.

2. Prior Art

It has been established that displays can be made using optical waveguides. Methods employing the electro-optic, acousto-optic and thermo-optic effect have previously been described. However, further improvements are required in the switching devices and system architecture to improve the resolution, image quality, power efficiency and price of this technology.

Examples of related U.S. patents include: U.S. Pat. Nos. 4,737,014; 3,871,747; 4,786,128; 5,009,483; and 5,106,181.

Important prior art is contained in the following publications: Chen S. Tsai (Ed.) "Guided Wave Acousto-Optics", Springer-Verlag, Berlin, 1990; R. G. Hunsperger "Integrated Optics: Theory and Technolog", Springer-Verlag, Berlin, 1991; K. Iizuka "Engineering Optics", Springer-Verlag, Berlin 1987; Bernd R. Hahn and Joachim H. Wendorff, "Piezo and pyroelectricity in polymer blends of poly(vinylidene flouride)/poly(methylmethacrylate)" Polymer, 1985 Vol. 26, October Pages 1611–1618; Bernd R. Hahn and Joachim H. Wendorff, "Compensation method for zero birefringence in oriented polymers", Polymer, 1985, Vol. 26, October Pages 1619–1622; Bernd Hahn and Joachim Wendorff, "Dielectric Relaxation of the Crystal-Amorphous Interphase in Poly (vinylidene fluoride) and Its Blends with Poly (methylmethacrylate), Macromolecules 1985, 18, Pages 718–721; M. Gottlieb & G. B. Brandt, "Temperature Sensing in Optical Fibers Using Cladding & Jacket Loss Effects", Nov. 15, 1981, vol. 20, No. 22, Applied Optics; Karl F. Schoch and Howard E. Saunders, "Conductive Polymers", IEEE Spectrum, June 1992, Vol 29, Number 6, Pages 52–56.

SUMMARY OF THE INVENTION

Objects of the Invention

Accordingly, it is an object of the invention to show how a liquid crystal cavity formed inside a flexible waveguide structure can be used to switch light.

A further object is to show how a tapered supercladding improves the resolution and contrast ratio of a waveguide display.

Yet another object is to show how a thin cladding layer can both lower the fiber manufacturing cost and increase the screen contrast ratio.

A further object is to show how a dark cladding material placed in close proximity to the cladding layer can be used to prevent light from traveling between consecutive reflector pits along the length of a fiber.

Another object is to show how electronic control techniques may be utilized to make liquid crystal fiber taps switch at high speed.

Yet another object of the invention is to show how a high efficiency color display can be constructed by separating color components of white light and focusing them into separate waveguide cores.

Another object is to show how brightness non-uniformity caused by temperature and manufacturing irregularities can be reduced with a feed-back system that places a photodetector at, or near, the end of optical waveguides.

A further object is to show how a layer of vertical conductors placed on the backside of waveguide ribbon can be used to simplify the connection of control electronics.

These and many further objects, features and advantages of the present invention will become more obvious from the following description when taken in connection with the accompanying drawings.

BRIEF DESCRIPTION

The invention comprises improvements in the individual components and system architecture of an optical waveguide display.

First, a liquid crystal waveguide tapping system is taught based on forming a waveguide, or fiber, with a liquid crystal layer in its center. The liquid crystal layer changes its index of refraction in the presence of an electric field. By forming a liquid crystal layer in either the cladding, core or supercladding, light can be selectively switched out at different places along the length of a fiber.

Integrating the liquid crystal layer in the center of a fiber helps simplify the manufacturing of a waveguide display. Liquid crystal fibers enable large areas to be covered simply and inexpensively. This constitutes a major improvement over existing LCD approaches which require careful spacing and alignment of circuitry plates. Fibers provide the support structure to contain the liquid crystal layer so large areas can be easily covered.

Second, a tapered supercladding is introduced which helps improve the contrast ratio and resolution of the display. The tapered supercladding guides light that has been switched out of the core into a supercladding main chamber. Since the taper efficiently collects and directs light into the supercladding, the tap length is kept to a minimum. Short tap lengths increase the screen resolution.

Third, a dark supercladding closely spaced to the supercladding also helps improve the contrast ratio of the display by preventing light from traveling between reflector pits along the length of the fiber. The dark cladding absorbs stray light produced at a reflector pit.

Fourth, a feed-back control system that reduces screen brightness irregularities is introduced. Liquid crystals undergo a large refractive index change in different temperature conditions. Refractive index variation will cause waveguide taps to change their operational characteristics. Consequently, the screen brightness may vary depending on the temperature of the environment where the screen is operated. A feed-back control technique based on the use of at least one photo-detector at the fiber ends is detailed that enables brightness irregularities to be electronically canceled.

Fifth, an electronic control technique is described that increases the speed of fiber taps. The technique relies on the fact that only small refractive index changes are needed in the electro-optic switching layer to switch large amounts of light out of a waveguide. The alignment and relaxation time of a liquid crystal depends on the applied electric field. By significantly changing the electric field conditions, and then fixing the electric field at the desired level, a desired refractive index can be quickly attained.

Sixth, a new fiber based on a three-core/shared supercladding main chamber is introduced that allows high resolution, full color operation, to be achieved. This three-core design, coupled with a broad-spectrum light source that has been separated into red, green and blue components, enables highly power efficient display screens to be constructed.

The attainment of the foregoing and related objects, features and advantages of the invention will be more readily apparent to those skilled in the art, after review of the following more detailed description of the invention, taken together with the included drawings.

DRAWING DESCRIPTIONS

DRAWING REFERENCE NUMBERS

Figure 1:
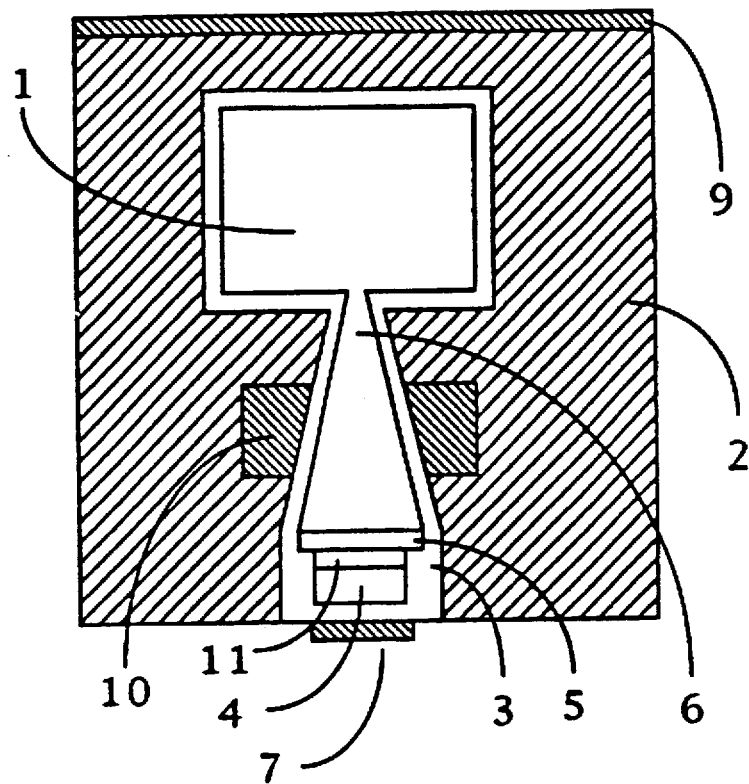
FIG. 1 is an end view of a single core electro-optic fiber.

1 Supercladding main chamber
2 Dark cladding
3 Cladding
4 Core
5 Electro-optic material, or Liquid crystal chamber, or Liquid crystal material
6 Tapered supercladding
7 Control electrode
8 Conductive separation barriers
9 Reference electrode
10 Reference electrode
11 Intermediate cladding
12 Ridged intermediate cladding or core
14 Irregularly shaped supercladding main chamber
16 Electric field
17 Light collecting in supercladding main chamber
18 Core and cladding have same refractive index
19 Light escaping from the core
20 Control electrode charged with a voltage
21 Control electrode with no voltage
22 Light guided in the core
23 Large amount of light in core
24 Intermediate amount of light in core
25 Small amount of light in core
26 Light beam
27 Grating spacing
28 Interaction length
29 Width of interaction medium
30 2nd order beam
31 1st order beam
32 0th order beam
33 1st order beam
34 2nd order beam
35 Reflector pit cut in supercladding main chamber
36 Grating elements
37 0th order beam
38 1st order beam
39a Highest voltage
39b Increasing refractive index
40a High constant bias voltage
40b High constant refractive index
41a Lowest voltage
41b Decreasing refractive index
42a Low constant voltage
42b Low constant refractive index
43a Highest voltage
43b Increasing refractive index
44a Intermediate voltage
44b Intermediate refractive index
45 Fiber reference electrode connector
46 Light detector
47 Viewing window
48 Selected tap electrode row
49 Tap electrodes
50 Selected intensity modulator
51 Intensity modulator control electronics
52 Optical waveguide or fiber
53 Light
54 Tap control electronics
55 Light scattered to the viewer
56 Ridged scattering material
57 Light barrier
58 Fiber or optical waveguide
59 Light emitted from fiber
60 Protected clear layer mounted on fiber front
61 Fresnel lens element
62 Reflective surface
63 Forward scattering diffusing layer
64 Reflective element
66 Transparent support medium
67 Ribbon waveguide element 68 Microlens array
69 Focusing lens
70 3 colors of light enter at 3 different angles
71 Green light
73 Red light
74 Mirror
75 Light detector
76 Mirror
77 Mirror
78 Collimating lens
79 Collimating lens
80 "Cold" dielectric mirror
81 "Hot" dielectric mirror
82 Light source collimating mirror
83 Light source
84 3 element coloring filter
85 Electric motor to spit filtering element
86 Synchronization signal
87 Signal applied to control electrode 88
88 1st control electrode or fiber tap
89 Signal applied to control electrode 90
90 2nd control electrode or fiber tap
91 Photodetector
92 Photodetector at fiber tap
93 Light in supercladding main chamber
95 Sensor receiver, i.e.—A/D converter
96 Brightness compensation unit
97 Tap controller
98 Memory
99 Light tapped out of first tap
100 Light in 2nd tap's supercladding main chamber
101 Beam shaping optics section
102 Collimated beam of filtered visible light
103 Red reflecting only dielectric mirror
104 Blue-green light
105 Blue reflecting only dielectric mirror
106 Green light
107 Support film
108 Upper Fresnel lens element
109 Fiber
110 Vertical ribbon control line
111 Light traveling through ribbon core
112 Ribbon feed-through
114 Waveguide ribbon—back view
115 Ground support layer or film
116 Metal ground layer

DETAILED DESCRIPTION
FIBER TYPES

FIGS 1–4 show different types of fiber waveguide end profiles. In FIG. 1 light is carried through the core 4. Light is confined by a low index cladding 3 surrounding three sides of the core 4. The fourth side contacts a thin, low index intermediate cladding 11 on the top side of the core 4. Intermediate cladding 11, the use of which is optional, is made from a low index material closely matched to the core 4 index of refraction. The intermediate cladding 11 is thin enough to enable the evanescent field of core 4 guided light to extend into the electro-optic layer 5. It is the electro-optic layer 5 that switches light out from the core 4 and into the tapered supercladding 6.

The addition of intermediate cladding layer 11 enables the construction of a fiber which can guide long distances. Since the intermediate cladding layer 11 is made out of a high quality optical material similar to that used in the cladding 3, the losses caused by the electro-optic layer 5 are minimized. Light is mostly confined within traditional cladding materials in regions 3 and 11, with only a fraction extending into the electro-optic region 5. The cladding 3 is typically very low index with respect to the core 4.

The use of the intermediate cladding layer 11 means less of the light will extend into the electro-optic layer 5. Therefore, longer tap lengths will be required to get light out of the core. Long tap lengths translate into decreased screen resolution. Therefore, fiber guiding properties can be traded off against tap switching efficiency and tap length by the addition of the intermediate cladding layer 11.

There is a relationship between the index of refraction of intermediate cladding 11 and how thin the intermediate cladding 11 must be to enable the evanescent field of core 4 guided light to extend into the electro-optic layer 5. If the refractive index of the intermediate cladding 11 is much lower than the core 4 refractive index, the intermediate cladding 11 must be very thin to enable evanescent field of core guided light to extend into the electro-optic layer 5. If the refractive index is slightly less than the core's 4 refractive index, the intermediate cladding 11 can be much thicker, and still have the evanescent field of core 4 guided light extend into the electro-optic layer 5. Multiple intermediate cladding layers 11 (Not Shown) may be used with different indexes of refraction to achieve complicated light distribution patterns within the core 4/electro-optic layer 5 boundary if desired.

Many electro-optic materials used in layer 5 significantly scatter and absorb light. In fact, the very property that makes electro-optic materials attractive for use as a switching element, such as easily changing their index of refraction, tends to increase scattering losses due to index of refraction non-uniformity's in the electro-optic material 5. The intermediate cladding layer 11 helps minimize losses due to irregularities in the electro-optic layer 5.

A different method of making the fiber guide long distances (Not Shown) is to make the low index cladding material 3 wrap around a majority of the core. In this configuration layer 11 would be replaced by the cladding 3 and a small channel, narrower than the width of the core 4 would contain the electro-optic material 5. This channel contacts the core 4 directly. For example, the narrow channel may contain a liquid crystal material. By making the electro-optic channel very narrow, light can still be tapped out, but with a greater tap interaction length, than if a wider region is used.

In general, the tap length can be reduced by increasing the core's 4 contact with the electro-optic material 5. Thus, electro-optic materials on more than one side of the core 4 will reduce the tap interaction length. For example, liquid crystal materials placed on either side of the core will shorten the tap length. Also, a very wide, narrow thickness, core 4 will have a short tap length. U.S. Pat. No. 5,009,483 shows examples of a wide, narrow thickness core, with electro-optic materials on either side. This configuration can be used with liquid crystals to form a very short length tap.

Switching layer 5 is preferably made of liquid crystals. It may be necessary to make the liquid crystal switching layer 5 wider than the fiber core 4 so that the liquid crystals aligned along the vertical wall (the y-axis as one looks at FIG. 1) of the liquid crystal layer 5 do not cause core light to leak by forming a high index region near the walls of the liquid crystal layer 5. This wider electro-optic layer 5 separates surface aligned liquid crystals on the vertical walls from the core 4. Thus, the liquid crystals closest to the intermediate cladding 11 or core 4 are uniform. Uniformly aligned liquid crystals translate into a uniform electro-optic switching region 5. This helps make the fiber guiding and switching properties more predictable.

An electric field extends between a control conductor 7, on the outside of the fiber, and a ground or biasing reference conductor 9 or 10. In the simplest case the biasing conductor 9 and control electrode 7 form a field all the way through the fiber. The field between the electrodes 7 and 9 causes the liquid crystals in liquid crystal cavity 5 to become aligned. This alignment reduces the index of refraction along the orientation of light flow in the liquid crystal layer 5. Thus, when a field is applied between 7 and 9 the fiber guides light well. However, when the field is removed, the liquid crystals in layer 5 becomes less aligned and increase their refraction. This increase in refractive index causes guided light to exit the fiber core 4 into the tapered supercladding 6.

Since the electric field extends completely through the fiber when electrodes 7 and 9 are used, the drive voltage to switch the fiber tap is high. A conductive material imbedded in the fiber enables lower drive voltages to achieve the same field densities. By reducing the distance between the biasing electrode 10 and the control electrode 7 lower voltages can be used to switch the fiber tap. Biasing electrode 10 runs the length of the fiber.

Conductive plastics made with loaded metal or graphite particles may be used to make biasing electrode 10. New polymers which are inherently conductive may also be used. Such conductive polymers are discussed by Karl F. Schoch and Howard E. Saunders, in an article entitled "Conductive Polymers" published in the June 1992 IEEE Spectrum. Either way, the conductive element should be a thermoplastic, or glassy compound so it can be put in the fiber preform and stretched in the fiber drawing process. If glass is used to make the fiber, a number of inorganic and organic dopants can be to the glass to make it conductive.

A different approach to decreasing the separation of the biasing 9 and 10 and control 7 electrodes is to groove the fiber (Not Shown) deeply either on the sides or on the top. The groove can be metalized to bring the biasing electrode close to the electro-optic cladding layer 5. This general idea of getting the electrodes closer together to reduce the drive voltages is shown in the fiber shown in FIG. 4.

It may be necessary to coat the inside of the liquid crystal cavity 5 with a material which can not be dissolved by the medium contained in the cavity. Possible mediums contained in cavity 5 include gases, liquids and solids. For example, liquid crystal materials can cause the walls of the electro-optic layer 5 in a plastic fiber to dissolve. Consequently, it may be necessary to line or coat the liquid crystal chamber walls 5 in plastic fibers to prevent liquid crystals from dissolving the plastic chamber walls. Possible liners in a PMMA fiber may include PVDF or PVDF/PMMA blends. Teflon and Teflon derivatives may also be used to protect the walls of the liquid crystal cavity 5.

The fiber, when it is formed in the fiber drawing process, will naturally cause the liquid crystals to become aligned along the length of the fiber elongation. This alignment is caused by the longitudinal orientation of molecules in the liquid crystal chamber 5 walls along the direction of light flow. Liquid crystal surface alignment along the axis of light flow may be used advantageously to increase the switching speed of the fiber tap. This effect is discussed in the next section on surface mode liquid crystal devices.

Since the supercladding 6 has a higher index of refraction than the core 4 and electro-optic cladding 5, light switched out from the core 4 will be angled in a direction normal to the direction of light flow through the core 4. Therefore, once light enters into the tapered supercladding 6 from the core 4 it is angled in direction toward the main supercladding chamber 1. Refracting light up and away from the core 4 is needed for the subsequent trapping of light in the supercladding main chamber 1.

The supercladding 1 and 6 must have a high refractive index relative to the core 4 and claddings 5 and 11 in order to trap light in the main supercladding chamber 1. Assuming a PMMA core 4, and a fluorinated acrylic cladding 3, a high index supercladding 6 can be made from polystyrene or polycarbonate. If glass is used to make the fibers, Schott Glass Co. has a large range of glasses that are suitable to achieve the desired refractive index differences between the core 4, electro-optic cladding 11, and supercladding 6.

Tapering the supercladding 6 to a constricted point before the supercladding main chamber 1 helps accomplish several important functions. First, it helps contain light switched out of the core 4 in the main chamber 1. In the same way a small hole in a large light-tight box causes light entering the hole to become trapped, light that enters the main chamber 1 will have a low probability of re-exiting through the small opening. Making the main supercladding 1 have a higher index of refraction than the tapered supercladding 6 section also helps increase the amount of light that stays in the supercladding main chamber 1.

Increasing the relative fraction of light carried in main chamber 1 vs. the tapered section 6 is critical to increasing the screen contrast ratio. The screen contrast ratio is partly determined by the amount of light that "bleeds" from one reflector pit 35 to the next along the length of a fiber. There will always be some cross-talk between consecutive reflector pits 35 along the length of a single fiber. In other words, all the light in the supercladding main chamber 1 will not be entirely reflected out at a single supercladding reflector pit 35.

Light will travel between consecutive reflector pits 35 because the pit is not cut far enough into the supercladding 1 and 6 to keep all the light in the tapered part of the supercladding 6 from continuing through the fiber and being reflected at the next reflector pit 35.

However, the ratio of light in the tapered supercladding region 6 vs. light in the main chamber 1 can be adjusted by making the tapered opening into the supercladding main chamber 1 very narrow. A majority of the light will then be trapped and carried in the main chamber 1. Collecting the light in the supercladding main chamber 1, in turn, decreases the amount of light that makes it through the tapered supercladding 6 to the next reflector pit 35.

As light bounces against the walls in the taper 6 the angle of its lateral incidence, (left-right as one stares into the fiber end of FIG. 1), increases. For example, if the light in a 30 uM core 4 fiber has an angle of propagation of 5 degrees, and it enters the main chamber through an opening 5 microns wide, the angle of propagation will have increased to 30 degrees at the constriction just before the supercladding main chamber 1. The angle of incidence caused by the constriction should not exceed the critical guiding angle of the supercladding 6 and 1/cladding 3 interface. It helps to have a very well collimated beam of light in the core 4 from the light source.

The tapered region 6 also serves to physically space the core 4 apart from the main chamber 1. Separation is needed because the reflector pits 35 formed in the fiber, usually via a cutting process, must not damage the core 4 and liquid crystal layer 5. Spacing the core apart from the supercladding main chamber 1 with the tapered supercladding region 6 minimizes potential damage to the sensitive core 4 and electro-optic cladding 5 during the pit formation process. The tapered region 6 also allows a large core 4 to be used in a fiber, and still trap an acceptable amount of light in the supercladding main chamber 1. A large core 4 is easier to couple light into from the light source 83.

The supercladding taper 6 between the core 4 and supercladding main chamber 1 can be made in many different shapes. It is shown in FIGS. 1–4 only as linear or straight line. However, it may also have a parabolic, exponential or even "T" shape. In fact, an exponential shaped taper would allow the biasing element 10 to be placed closer to the control electrode 7 to reduce the waveguide tap drive voltages.

The supercladding main chamber 1 and taper 6 may include a pigment or dye to selectively filter broad-spectrum light carried in the core 4. In this way white light coupled out of the core 4 will be colored as it travels through the supercladding 1 and/or 6 enabling colored images to be displayed.

The low index cladding layer 3 is made thin to help reduce the manufacturing cost of the fiber. Presently, low index cladding materials suitable for use in plastic fibers are expensive. Currently, they are made out of fluorinated acrylics and cost around $200 U.S./pound. Thin cladding 3 layers reduce the amount of needed fluoro-polymers and thus significantly lowers the fiber manufacturing cost.

Keeping the electro-optic layer 5 thin also helps reduce the fiber cost. Liquid crystal material presently cost around $5 U.S./cc in large quantities. Thus, confining the liquid crystal material just in the thin, narrow, electro-optic switching region 5 reduces the amount needed of this expensive material.

A thin cladding 3 also allows the dark cladding 2 to be placed closer to the supercladding 6 and core 4. The close placement of the dark cladding 2 helps prevent stray light from traveling long distances down the fiber cladding 3 before being absorbed. Placing the dark cladding close to the supercladding 1 and 6 and core 4 is very important to improve the contrast ratio of the display. The dark cladding 2 prevents stray light from traveling through the cladding 3, and core 4 and supercladding 1 and 6 in non-guided modes, between adjacent reflector pits 35 along a fiber.

The dark cladding 2 contains a pigment or dye which absorbs visible light. Ideally, the dark cladding 2 should have an index of refraction that matches the cladding 3. Thus, stray light in the cladding 3 will enter the dark cladding 2 with little or no reflection or refraction at the cladding 3/dark cladding 2 interface and be absorbed by the pigment. The outside of the dark cladding 2 may also be metalized to further minimize cross-talk between separate fibers.

Figure 2:
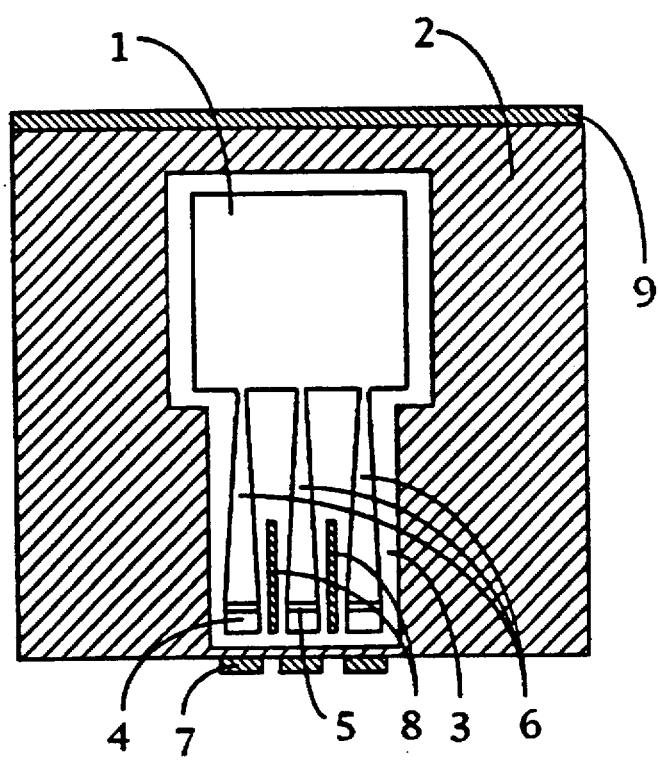
FIG. 2 is an end view of a three core electro-optic fiber.

FIG. 2 shows how a single fiber can be used to make a color display. Separate colors are carried in each of the three cores 4. Different colors of light switched out of the cores 4 will make it through the tapered supercladdings 6 to the main chamber 1, where they mix and are reflected at a reflector pit 35. Integrating three separately switchable cores 4 with a single supercladding main chamber 1 into a single fiber provides space savings. It also makes it easier to couple the 3 different colors of light into the fiber cores since the core to core spacing can be precisely controlled during the fiber manufacturing process.

The close placement of the cores 4 in FIG. 2 may cause cross-talk between control electrodes 7 which determine the amount of light taped out of each core 4. This cross-talk can be minimized by integrating a conductive material 8 in the fiber between the electro-optic claddings 5 and cores 4 of each fiber. Layer 8 shields the electro-optic layers 5 from electrical cross-talk from the control electrodes 7. Conductive separation layer 8 may be biased at different voltages with respect to the control conductors 7. This electrical isolation can also be made by making grooves that extend from the outside into the fiber. (Not Shown)

Figure 3:
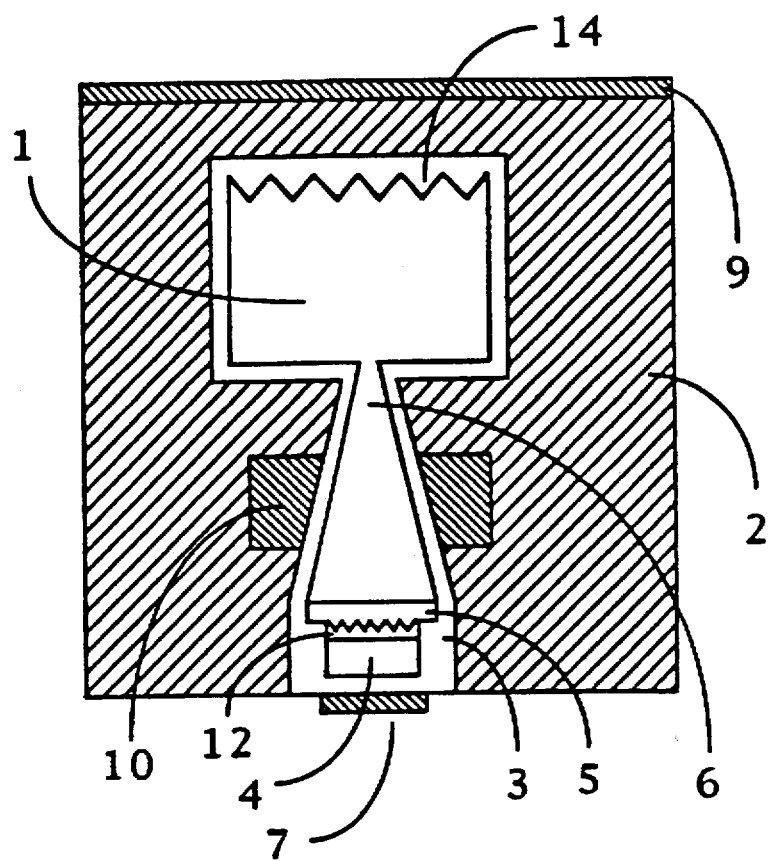
FIG. 3 is an end view of a liquid crystal fiber with ridges in the supercladding main chamber and intermediate cladding layers.

FIG. 3 shows grooves formed both in the intermediate cladding region 12 and the main supercladding 14. These grooves serve two completely separate functions. The intermediate cladding grooves 14 help align the liquid crystals along the surface of the intermediate cladding 12. Liquid crystal surface alignment helps electro-optic layer 5 switch faster. These grooves can also be formed directly on the surface of the core 4 to accomplish the same liquid crystal alignment function if the intermediate cladding 11 is not used.

Figure 13:
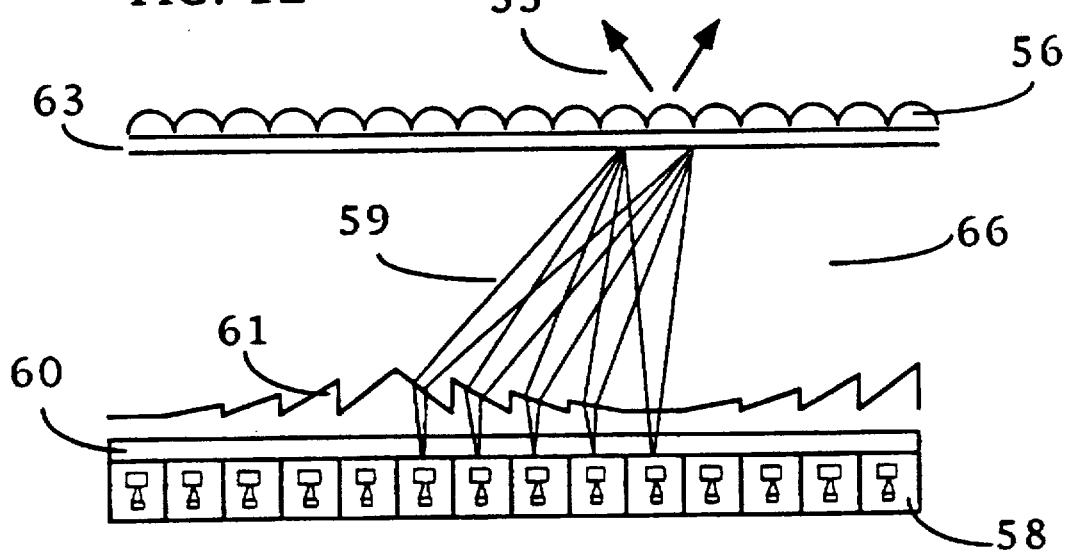
FIG. 13 is a fiber end view of showing how a Fresnel lens is used to compensate for lateral fiber spacing irregularities to create a straight pixel line along the direction of light flow in the fiber.
Figure 14:
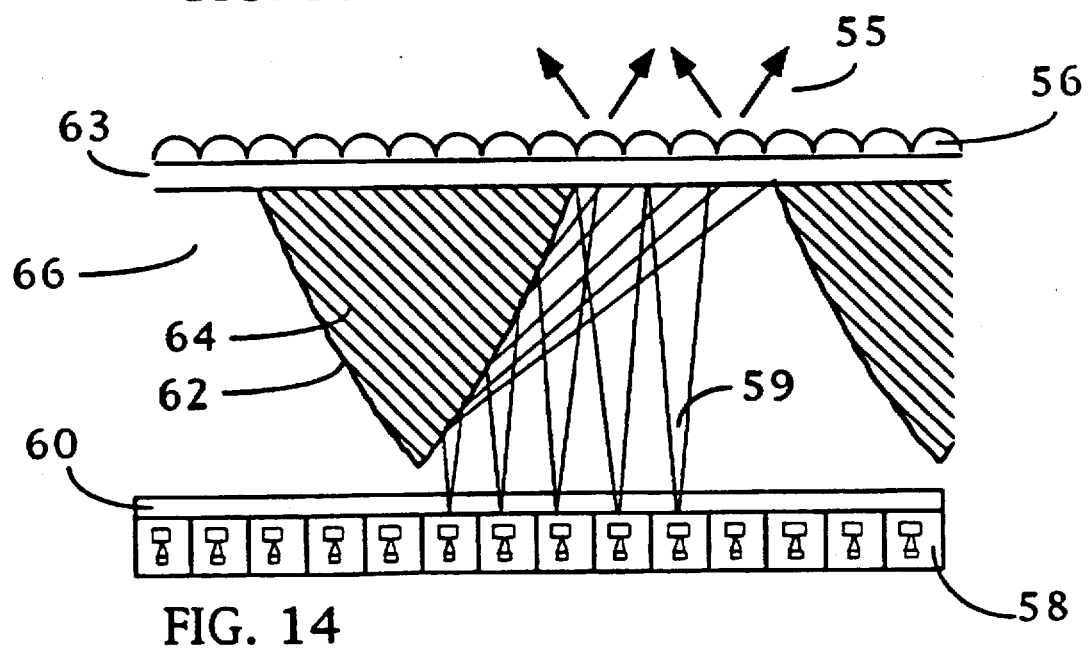
FIG. 14 is a fiber end view showing how a reflective element can reduce pixel column irregularities.

The irregular surface in the inside of the main chamber 14 helps scatter light so it is less likely to exit the main chamber 1 into the tapered region 6. Making the main chamber 1 in different shapes also can be used to increase the appearance of uniformity of the screen pixels. Since consecutive pixels are typically staggered on separate fibers, as shown in FIGS. 13–14, they will have a staircase, or other irregular appearance. By using lenses, and different shaped supercladding main chambers 1 for each fiber, this non-uniformity can be minimized.

Figure 4:
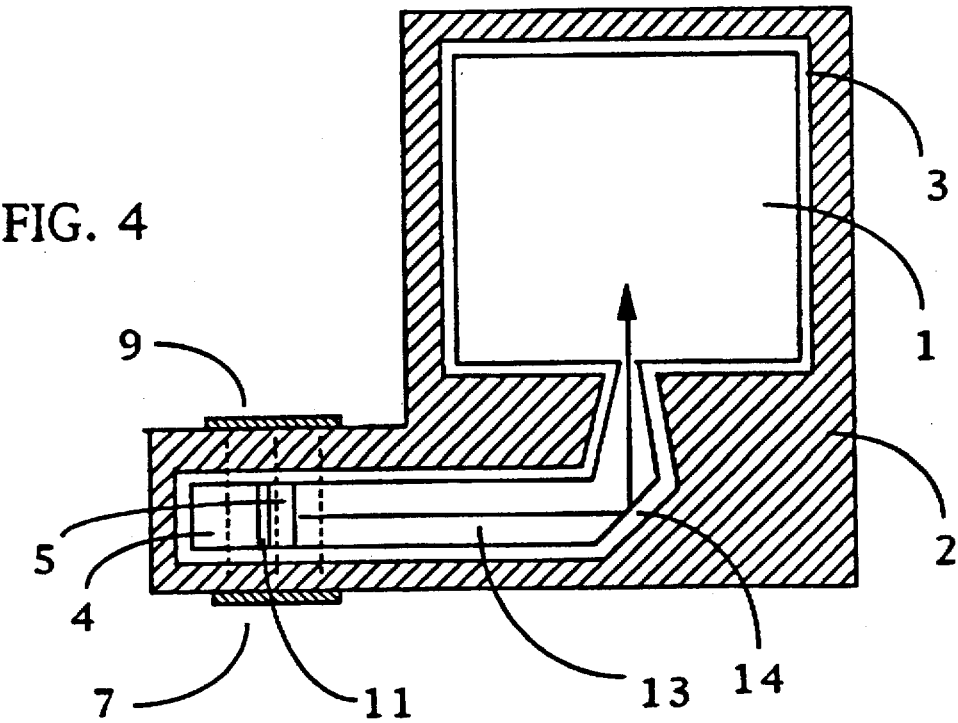
FIG. 4 is an end view of a fiber with a supercladding that reflects light into the supercladding main chamber from the side.

FIG. 4 shows a method whereby light is launched into the supercladding main chamber 1 from the side. This approach enables the close placement of the control 7 and biasing 9 conductors. This fiber geometry could be further improved by making two, instead of one, tapered supercladding 6 channels on either side of the main chamber 1. Or in a different configuration, a series of the "L" shaped tapered supercladdings 6 stacked on top of each other could allow three colors to be used for color operation. FIG. 4 also demonstrates how a different liquid crystal orientation in the electro-optic cladding 5 can be used to guide light in the fiber core.

LIQUID CRYSTAL LAYER

Liquid crystals undergo a large refractive index anisotropy, or change in birefringence, in an electric field. Three different types of crystals: Nematic, cholesteric and Smectic are of interest in this design. In each, the molecules are elongated and it is the relative orientation of these molecules which determine the index of refraction of the liquid crystal material. The axial orientation of the elongated molecules is described using a mathematical vector called the "director".

This description will focus on fiber taps employing Nematic and Cholesteric liquid crystals. In a Nematic liquid crystal, the orientation of all the molecules are parallel, but the molecules are randomly arranged perpendicular to the directors. A Cholesteric liquid crystal uses molecules with directors arranged in a helical fashion across the material. A complete turn of the helix will extend one pitch length along the helix axis.

Nematic liquid crystals are used in the preferred embodiment. They can be used in two important ways. The first utilizes surface alignment properties. When the surface material in cavity 5 is matched with the appropriate liquid crystal material, the liquid crystals will tend to lay down flat on the surface along the axis the fiber was stretched in. These surface aligned liquid crystals will have a higher index of refraction along the direction of fiber light propagation than those aligned in the electric field perpendicular to the fiber.

It takes a stronger electric field to cause surface aligned liquid crystals to become aligned in an electric field than liquid crystals distantly separated from the electro-optic cavity 5 surface. Furthermore, when the electric-field is removed, the liquid crystals near the surface of the electro-optic cavity 5 realign faster than those further away. Consequently, surface alignment effects can be utilized to make very high speed fiber switching devices. Surface alignment effects are discussed in Optical Shields Technology report describing their surface mode device.

Chemical treatment of the electro-optic cladding layer 5 walls after the drawing process may be necessary to induce surface alignment of the liquid crystals. The ridged surface of the intermediate cladding 12 or core 4 may also be used to increase the alignment. The proper choice of materials for the core and intermediate cladding 12 or 11 can also increase the degree of surface orientation of the liquid crystal layer.

Liquid crystals aligned along the electro-optic cladding walls will have a higher index of refraction than those aligned with the electric field. Thus, the liquid crystal layer aligned near the surface will have a high index and act as part of the core 4 to carry light. Liquid crystals further from the surface will be aligned with the electric field and will have a low index of refraction and act as a cladding to confine light in the core. The liquid crystal transition region between the cladding and core will have a varying index of refraction depending on the applied electric field and the alignment properties of the liquid crystal layer. However, when a field is applied normal to the direction of light propagation, the liquid crystal/cladding region will typically have a graded index profile ranging from high near the core to low in the center of the electro-optic switching cavity 5.

Anti-alignment agents may be used to prevent the liquid crystal molecules from aligning on the surface walls. In this case the entire liquid crystal cavity 5 will uniformly switch when an electric field is applied. In this case the liquid crystals near the walls will align in the electric field as easily as liquid crystals in the center of the cavity. This approach can be used to make high speed evanescent switching devices with a predictable, uniform, response. A non-surface aligned liquid crystal cavity 5, in conjunction with an evanescent coupling design, is considered to be an important high speed switching innovation.

Ferroelectric polymers could also be used in the electro-optic cladding layer 5. Ferroelectric polymers tend to be self aligning. They also have very fast switching speeds. The disadvantage with current ferroelectric material is their irregular orientation, which increases scattering. However, future ferroelectric polymers look promising and they may also be used in the electro-optic switching layer 5.

TYPES OF OPTICAL WAVEGUIDE TAPS

Depending on the dimensions of the core 4, electro-optic cladding 5 and supercladding 6, and the specific type of liquid crystal material utilized in the fiber, different classes of fiber taps can be constructed.

Figure 5:
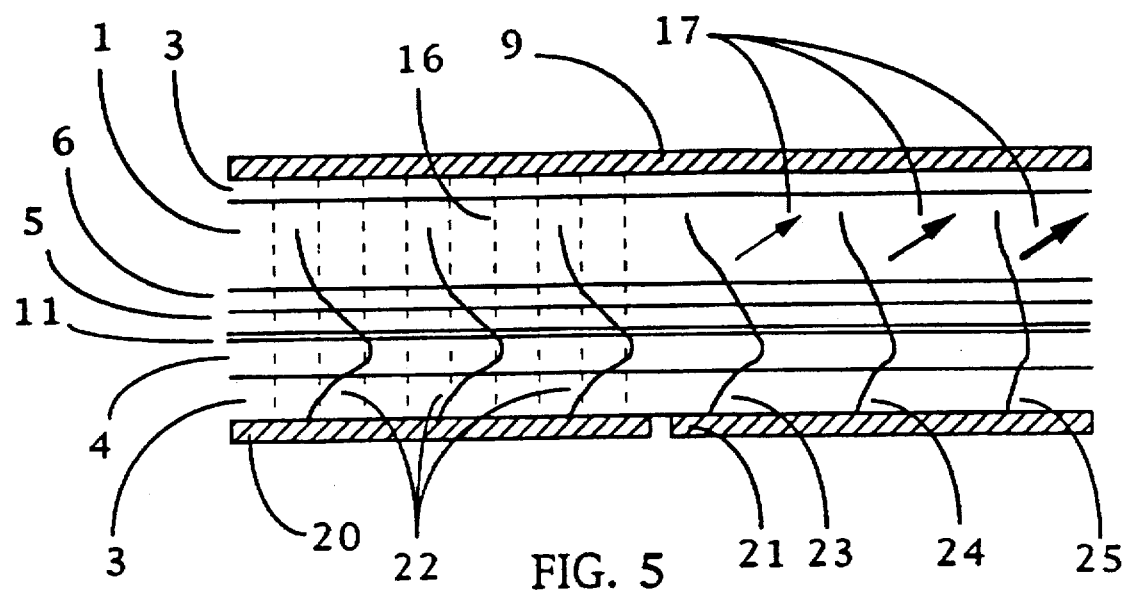
FIG. 5 is a side view schematic of an electro-optic fiber which shows how light is tapped out using a wave description of light.

FIG. 5 shows what happens if the core 4 is made very narrow. Only the zero order mode 22 of light can travel through core 4 when the core 4 is made very narrow. A single mode fiber is useful because it increases the interaction of the core guide light 4 with the electro-optic layer 5. Increased interaction with the electro-optic layer 5 decreases the tap interaction length and improves screen resolutions. A fiber with a narrow single mode core 4 will be called a "single mode" device and a wider multi-mode core a "multi-mode" device. Both single mode, and multi-mode devices can be used in this display.

If the distance between the core 4 and supercladding 6 is made very close, in other words, if the electro-optic cladding 5 is made very thin, the evanescent field of the core 4 guided light will extend 23, 24 and 25 into the supercladding 6. Evanescent coupling effects can be used to enable small electro-optic layer 5 refractive index changes to cause large changes in the amount of light switched into the tapered supercladding 6.

An evanescent fiber tap increases the fiber switching speed since the refractive index of the liquid crystal layer 5 does not need to change very much to move the evanescent field of the core guided light 22 into the supercladding 23, 24 and 25. Utilizing the full range of liquid crystal alignment in the electro-optic layer 5 is consequently not necessary to switch light out of an evanescent waveguide tap.

Evanescent couplers can be used with single and multi-mode fibers. A multi-mode evanescent tap will require longer tap distances to get light out of the core. Multi-mode cores may be used to increase the light guiding efficiency of the fibers. This is because light in the core 4 spends more time away from the electro-optic switching layer 5 traveling in the center of the core 4 and cladding 3. A single mode fiber used in an evanescent configuration will be called a "single mode evanescent device." A multi-mode fiber used in an evanescent configuration will be called a "multi-mode evanescent device."

Evanescent couplers have different tap efficiencies depending on the wavelength of light traveling through them. In other words, different light wavelengths are more easily tapped out of a given coupler than others. This color sensitivity can be reduced by having a large change in the index of refraction of the electro-optic layer 5. Since liquid crystals are capable of large refractive index changes, the color sensitivity of a liquid crystal evanescent fiber taps is typically not an issue. However, solid non-linear materials presently are capable of much smaller refractive index changes than liquid crystals. (On the order of $\Delta n < 10^{-4}$ vs. $\Delta n < 10^{-2}$ for liquid crystals.) Therefore, solid electro-optic switching layer 5 taps may require the use of multiple evanescent couplers, each specifically designed to work in a specific range of wavelengths. In this case a fiber structure similar to that shown in FIG. 2 may be used.

Evanescent couplers are very sensitive to the index of refraction of the electro-optic layer. Consequently, temperature and biasing conditions will greatly effect their operation. It is likely a photo-sensor will be needed at the end of each fiber to provide feed-back information to compensate for varying tap efficiencies caused by temperature fluctuations and manufacturing variances.

In a multi-mode evanescent device higher order modes will couple more easily into the supercladding 6 than lower order modes. Consequently, if a multi-mode fiber is used, it may be advantageous to couple only high order modes into the fiber from the light source.

Figure 6:
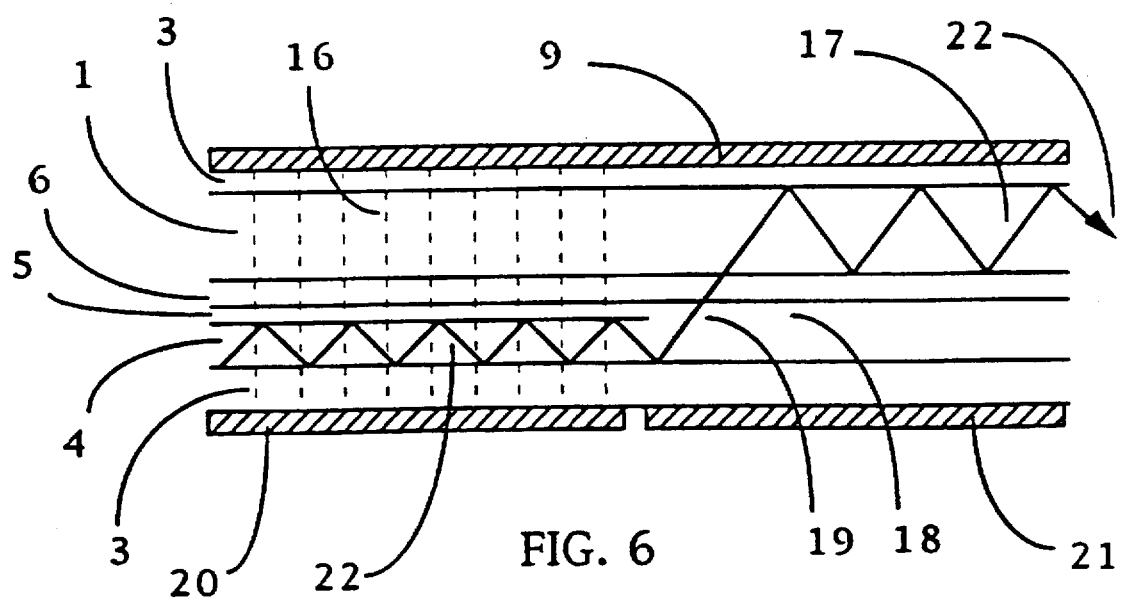
FIG. 6 is a side view schematic of an electro-optic fiber which shows how light is tapped out using a ray-optics description of light.

If a great change in the liquid crystal refractive index is used, as shown in FIG. 6, the entire liquid crystal layer 5 can be made to increase its index of refraction to the same, or higher, level as the core 4. A waveguide tap based on large refractive index changes does not need to utilize evanescent coupling to get light 19 out of the core 4. Therefore, the supercladding 6 does not need to be closely spaced next to the fiber core 4 to facilitate coupling. As a result, by using the entire switchable refractive index range in the liquid crystal layer 5, the tight tolerances needed in an evanescent tap can be relaxed.

In a large refractive index change device light tapped out of the core 4 travels through the electro-optic switching layer 5 until it exits into the supercladding 6 region. Light will ultimately refract out of the electro-optic cladding layer 5 if the supercladding 6 has a higher index of refraction. A tap which carries light long distances through the electro-optic region 5 will switch more slowly since it will take longer to fully align the liquid crystals to tap light into the supercladding 6. Furthermore, the tap interaction length will be longer because light will tend to travel through the electro-optic switching layer 5 greater distances before exiting into the tapered supercladding 6.

A tap that employs a large refractive index change can also be used without a supercladding 6. In this configuration light passes through the liquid crystal layer 5 and enters directly into a diffusing layer (Not Shown). This fiber configuration is particularly useful if the core is made very wide and narrow. This simple design may find use in low cost/simple displays. This type of waveguide electro-optic waveguide tap is disclosed in FIG. 8 of U.S. Pat. No. 5,106,181.

It is possible to make the entire supercladding 6 and/or 1 out of a liquid crystal material. This simplifies the fabrication of the waveguide fiber by requiring fewer materials and layers; since the intermediate cladding 11 and electro-optic cladding 5 can be combined into one large supercladding 6 and 1. Simplicity of construction is made possible since the supercladding 6 and 1 and electro-optic layer 5 can be combined into a single large cavity filled with liquid crystal material. A variant of this simplified approach is to make the core out of the liquid crystal material and make the cladding 3 and supercladding 6 solid.

A different type of waveguide modulator (Not Shown) utilizes Raman-Nath and Bragg diffraction. If a plurality of closely spaced electrode fingers are oriented lengthwise along the direction of light flow, a diffraction grating can be formed in the electro-optic material 5. If the electro-optic layer 5 is wide, (in the x-axis when looking at FIG. 1) and narrow (in the y-axis when looking at FIG. 1), light will be diffracted toward the sides (left and right using FIG. 1 as a reference) of the fiber core. Supercladdings at the sides of the core 5 (Not Shown) can collect this light and combine it in a single supercladding main chamber 1 so it can be reflected at a pit. This type of tap has the advantage that a wide, narrow, core 4 is easier to couple light into from the light source. An acousto-optic integrated optic device similar to this is described by Manhar Shah in Applied Physics Letter, Vol. 23, No. 10, Nov. 15, 1973.

Figure 7:
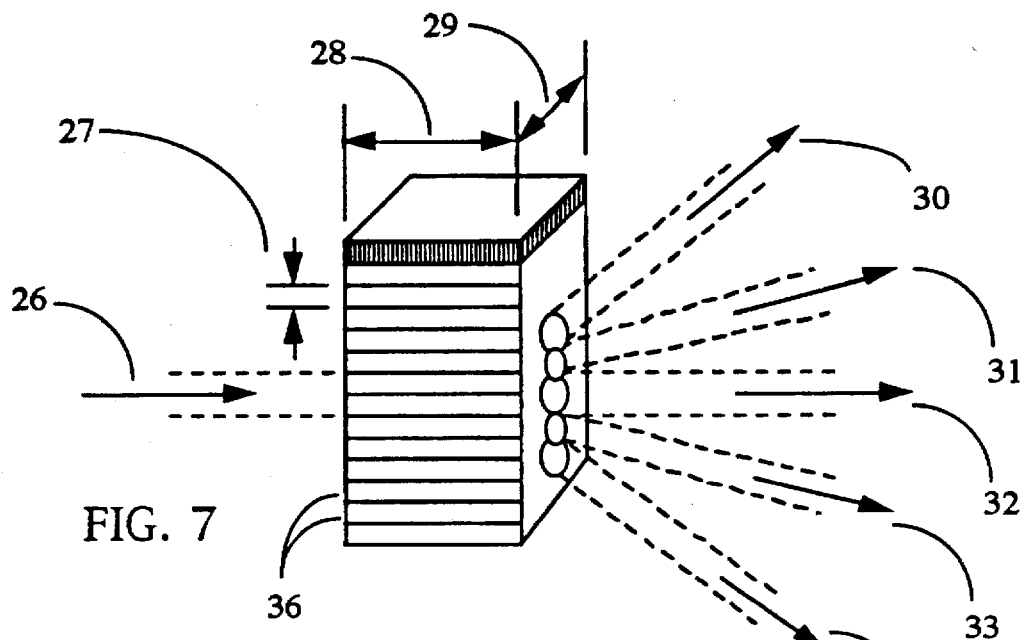
FIG. 7 is a side schematic view which shows how light is scattered in a Raman-Nath diffraction device.
Figure 8:
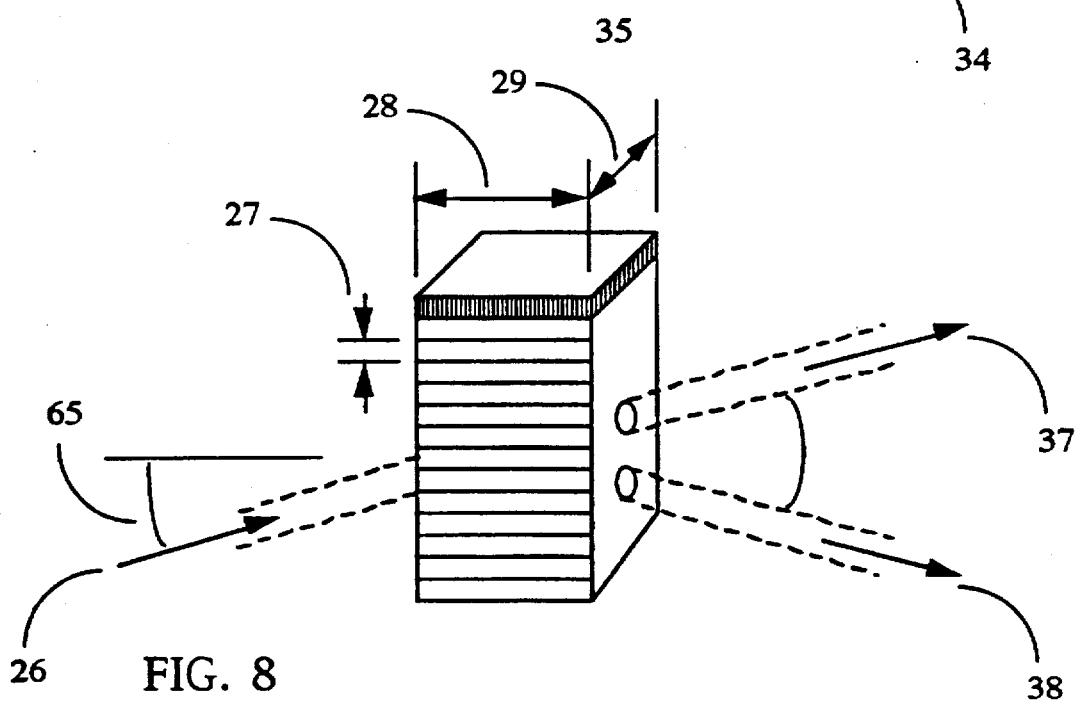
FIG. 8 is a side schematic which shows how light is scattered in a Bragg diffraction device.

FIGS. 7 & 8 show schematically how Raman-Nath and Bragg devices work. If Raman-Nath diffraction is used, as shown in FIG. 7, a series of short length 28 gratings 27 oriented along the axis of light flow 26 couple light into higher order modes 30, 31, 32, 33 and 34 in a tap region. If Bragg diffraction is used, as shown in FIG. 8, a continuous set of gratings at the Bragg angle 65, off-axis to the direction of light flow 28, will be needed to meet the Bragg conditions. Bragg and Raman-Nath type modulators can be made to operate in an electro-optic core, or supercladding. Also, these sorts of modulators could be made with either liquid crystal and/or solid electro-optic materials. An electrode may be needed over the multiple finger electrodes to provide a continuously aligned medium if liquid crystals are used in order to allow the fiber to guide light.

All of the modulators described above can use either surface aligned liquid crystal materials, or non-aligned materials. The basic breakdown of modulator types is thus:
Single mode:
  non-evanescent
    surface aligned LC
    non-surface aligned LC
  evanescent
    surface aligned LC
    non-surface aligned LC
Multimode
  non-evanescent
    surface aligned LC
    non-surface aligned LC
  evanescent
    surface aligned LC
    non-surface aligned LC The distinctions between these different classes of modulators depends on the dimensions, arrangement, and choice of materials employed in a particular fiber. The exact classification between a specific modulator type will often be difficult to clearly identify. For example, even with anti-alignment agents, there will still be some surface alignment of the liquid crystals in the electro-optic cavity 5. Consequently, modulators designed to operate specifically using one approach may have operational characteristics similar to fiber taps using other approaches.

MATERIALS

This section describes commercially available materials that are considered important for making optical waveguide displays.

Liquid crystal materials made by Merck are likely to be used in the electro-optic cladding layer 5. The Merck Nematic liquid crystal product line has an index of refraction ranging from between 1.478<1.5. Thus, Merck Nematic liquid crystals may be used with a wide range of different plastics and glasses that have different indexes of refraction.

One approach is to make optical fibers out of glass or silica. Glass, which is often used in fiber optic applications, is the most promising inorganic compound. Schott Glass Co. sells glasses with a variety of different refractive indexes that are readily combined with liquid crystals to make a glass-fiber display. Glass fibers can be pulled with excellent uniformity and with hollow cores running through their centers. These hollow glass fibers can be filled with liquid crystal material after drawing to make an electro-optic cladding layer 5. Collimated Holes, in Campbell California presently manufactures hollow core glass fibers that could be adapted to large screen displays.

A new class of low temperature glasses being researched by Corning Glass works may also be used. These glasses are discussed in the July 1992 Scientific American. Low temperature glass can be doped with organic dyes to achieve non-linear effects. Furthermore, certain inorganic materials, i.e.—lithium niobate, with large non-linear effects can also be mixed or embedded in a glass matrix to achieve the electro-optic properties needed for a display.

The most promising materials, however, are polymers. Of these, Poly (Methylmethacrylate) or PMMA, Poly (Ethylmethacrylate) or EA, Poly (Vinyladeneflouride) or PVDF, Polycarbonate, and Polystyrene are the most attractive. These plastics are inexpensive, thermo-processible, commonly available, and have excellent optical transparency.

For example, PMMA made by Rohm & Haas under the brand names V-825, VS-100, VM-100, and VLD is preferably used to make many different fiber structures. Specifically, the 825 is the highest purity PMMA and is most promising for use in the core 4. The VS-100 is a co-polymer mixture with EA and tends to have a lower index of refraction compared with V-825. Therefore, the VS-100 is useful as a intermediary cladding 11. The VS-100 has also been used as the cladding 3 since it is also a co-polymer system with EA.

PVDF made by Ato-Chem of North America and sold under the brand name of Kynar is also an important plastic. Kynar in the 710–780 family of products may be used in the dark cladding 2, and as a possible liner for the electro-optic chamber 5. Pure PVDF is also an electro-optic material.

Aligned and poled PVDF sheet are sold by Ato-Chem under the brand name Kynar Piezo film. A poled PVDF-based material may be used as a solid electro-optic cladding layer 5. Presently, the optical properties of pure PVDF are poor since it is semi-crystalline, and the amorphous and crystalline regions have different refractive indexes and tend to scatter light. This scattering, however, is reduced in PVDF/PMMA blends, and therefore blends show great promise for use in the electro-optic switching layer.

PVDF and PMMA blends may be used to form a low-cost, low-index cladding material. These two plastics form an amorphous co-polymer system with a low index of refraction when mixed in ratios of 40% or more of PMMA. This copolymer system may be used in the cladding 3 or, more likely, in the dark cladding 2. The optical clarity of this mixture depends significantly on the temperature and extruder mixing conditions. A well mixed PVDF/PMMA composite has excellent optical properties. In the dark cladding 2 a pigment or dye will be added to the PVDF/PMMA co-polymer system to allow it to absorb stray incident light. Avecor, in southern California, sells pigments and dyes which may be mixed to darken the plastic. PMMA/PVDF mixes are considered to be very important in lowering the cost of fibers.

A translucent, poorly mixed combination of PVDF and PMMA can be used as a scattering material. Polystyrene and PMMA is similarly translucent and can also be used as a scattering material. Rohm & Haas also makes a plastic that tends to selectively forward scatter light. Forward scattering films are very important for use in the diffusing layer in the output section.

Low index fluoropolymers, specifically those made of fluorinated acrylic, may be used in the cladding 3. Polymer Technology, Hoechst Celanese and Mitsubishi Rayon all make fluorinated acrylic which can be used as a low-index cladding 3 layer. A different type of low-index plastic that may be used in the cladding 3 is sold under the brand name Cytop, and is made by Asahi Chemicals of Japan.

Solid electro-optic materials, in particular polymers, may also be used in region 5. Polymers that are both cross-linked and amorphous can be employed. A manufacturing technique utilizing cross-linked polymers, which are poled immediately after the fiber is drawn, is discussed in a pending patent that focuses on manufacturing techniques.

A high index plastic is needed in the supercladding 6 and 1. Polycarbonate and Polystyrene are both high index plastics which may be utilized.

The mounting substrate and output optic layers may be made out of flexible materials to enable the screen to be rolled up. Since these layers may need to be thick to focus and scatter light properly, they must be made very pliable. Rubber-based, silicon-based and/or polyurethane compounds are important materials for use in screen substrate, focusing, and scattering components.

DRIVING INDIVIDUAL WAVEGUIDE TAPS

The polarity between the controlling electrode 7 and the biasing electrode 10 or 9 may need to be reversed periodically to prevent long lasting liquid crystal alignment in the liquid crystal cavity 5. Extended periods of alignment in a non-changing electric field can cause the liquid crystals to become semi-permanently aligned. The result is that even when the electric field is removed, liquid crystals do not change their refractive index. Such alignment problems causes the guiding and switching properties of the fiber to change over time. Periodically reversing the polarity of the biasing electrodes 10 or 9 and control electrode 7 helps prevent long-lasting liquid crystal alignment.

Certain electro-optic materials may have a higher index of refraction when an electric field is applied than they do without the electric field. The drive signal approaches discussed in this section should include these sorts of materials. Therefore the terms guiding and non-guiding, when an electric field is present, should be used interchangeably. It will be assumed for simplicity, however, that the index of refraction decreases, as it does in most liquid crystal configurations, when an electric field is applied.

Fiber optic liquid crystal taps can be electrically driven in at least three different ways. First, it is possible to operate the liquid crystal fiber tap in a simple on/off voltage mode. When the voltage is on, or high, the crystals will be aligned, and the fiber will guide. When the voltage is off, the liquid crystal layer 5 will increase its refractive index and the core 4 will lose light into the supercladding 6.

The second major approach biases the tap with a DC component in the off state to facilitate the use of surface aligned liquid crystals. Surface aligned liquid crystals can be used with biasing to increase the tap speed. For example, when "on" an electric field is applied just above the threshold needed to align surface liquid crystals and make the fiber guide. When the voltage is dropped from this high level, the surface liquid crystal layer will quickly fall back in alignment with the liquid crystal cavity 5 wall. This realignment is accompanied by an increase in the surface liquid crystal refractive index and causes light to couple out of the fiber.

In a tap based on surface alignment effects, the bias voltage level used in the off, or non-guiding state, and the high voltage level used in the on, or guiding state, is typically higher than that used in a non-surface mode device. This is because the voltage needed to align the liquid crystals near the surface walls is higher than the voltage needed to align liquid crystals in the middle of the, electro-optic cavity 5. The exact voltage required depends on the alignment properties of the liquid crystals themselves and cavity 5 wall surface properties.

The third major biasing and drive approach is useful in both surface mode devices, and non-aligned evanescent and non-evanescent devices. It is based on the fact that the range of refractive indexes a liquid crystal can achieve in an electric field is very large. By not using the entire liquid crystal refractive index range, and using large voltage swings, the time needed to achieve a given refractive index can be reduced.

Figure 9:
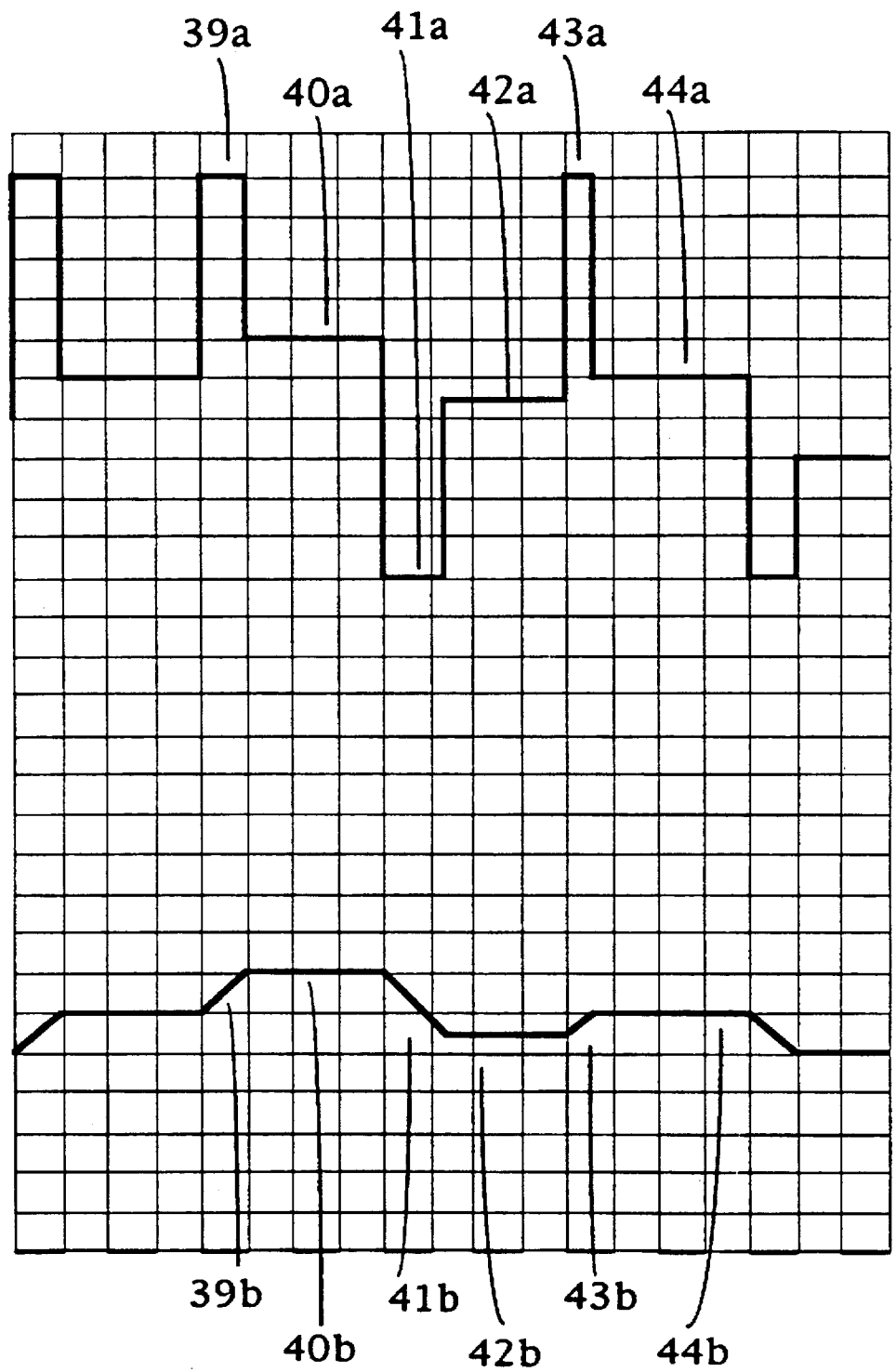
FIG. 9 is a plot which shows how the index of refraction in a liquid crystal material can be adjusted by applying a large, changing, electric fields.

FIG. 9 shows how this approach works. A large voltage swing 39a is used to switch the liquid crystal layer from one semi-aligned state 39b to another 40b. The large voltage change accelerates the rate of liquid crystal alignment 39a, or un-alignment 41a, to quickly achieve the desired index of refraction. Once the desired index of refraction is achieved, the new refractive index is fixed by adjusting the voltage level 40a and 42a to a point needed to maintain alignment.

This driving method can be used to increase the switching speeds of evanescent couplers. Evanescent couplers need only a small refractive index change 40b, 42b and 44b to achieve large changes in their light coupling efficiency. Therefore, they can be used with the large voltage swing technique to achieve high switching speeds. It is believed this large voltage swing switching technique is quite different than any liquid crystal drive technique mentioned in the prior art.

Grey scale operation can be realized by operating the liquid crystal layer at a level between full and non-alignment. Intermediate levels of alignment will cause only a fraction of the light to be taped out of the fiber core. Coupling intermediate amounts of light out at intensity modulators 50 enables gray-scale images to be formed.

The amount of light coupled out of a fiber tap is not a linear function of the applied voltage. In other words, half the voltage will not always switch out twice the amount of light from a fiber tap. Particularly in evanescent taps, or taps which employ surface effects, the switching characteristics of the tap will depend in a very complicated way on the applied voltage.

Circuitry may be needed to translate a desired tap brightness level into a voltage that can be used to drive the tap control electrode 7. This circuitry may need to have a very high precision. For example, if the function of light intensity for a given voltage is anything other than a first order linear function, voltage control with a precision higher than the desired output gray scale resolution will be needed to achieve a desired gray scale resolution. In other words, if a standard digital to analog converter is used to drive the taps to make gray scale values, a resolution of more than 8 bits may be needed to achieve 8 bits worth of brightness at the fiber tap.

An entirely different approach to achieving grey scales is to control the time the tap is turned on. In this case, the voltage is switched "LOW", to cause the tap to switch light out, only for the amount of time needed to get a desired brightness. The total brightness of light at a fiber tap is thus determined by integrating the amount of light tapped out during it's "HIGH"/"LOW"/"HIGH" voltage interval. This approach is promising because simple digital electronics can be used to achieve grey scale operation. Using time duration to achieve grey scale is particularly effective when used with high speed taps.

If the tap switches slowly, the amount of light coupled out of a fiber tap is, like the analog approach, not a linear function of the time the tap is actively turned. Therefore, circuitry may be needed to translate a desired tap brightness level into a time interval that can be used to drive the tap. It is possible a Digital Signal Processor (DSP) may be used to translate the desired brightness to a corresponding intensity modulator time interval.

The capacitance of fiber taps, using both liquid crystal and solid electro-optic materials, is very small. Since the light is guided in a narrow channel, very small area control electrode plate 7 is needed to aligned the small amount of material in the liquid crystal layer and cause a significant change in the guiding properties of the fiber. Low capacitance fiber taps can be driven with low-power, low-cost, FET's, MOSFET's and bipolar circuits.

CONTROL ELECTRONICS

Before high quality screen images can be formed, the output brightness of the screen needs to calibrated. There are two sources of brightness irregularity in a waveguide screen. The first is caused by manufacturing variations and will cause a fixed pattern of brightness non-uniformity. The second is caused by temperature and changing mechanical conditions in the environment where the screen is operated.

The first source of brightness irregularity can be corrected by making a map of the screen brightness. A calibrated video camera or photo sensor aimed at the screen is used to measure and record the relative intensities of image pixels under controlled conditions. This brightness map is saved in a memory device and combined with image data in the display controller at the time of image generation to make brightness corrected images.

The second source of brightness irregularity is caused by temperature variations. Fiber taps are very sensitive to the index of refraction of the electro-optic layer. Liquid crystals change their refractive index dramatically with temperature. Thus temperature conditions will cause the switching properties of fiber taps to change.

Figure 11:
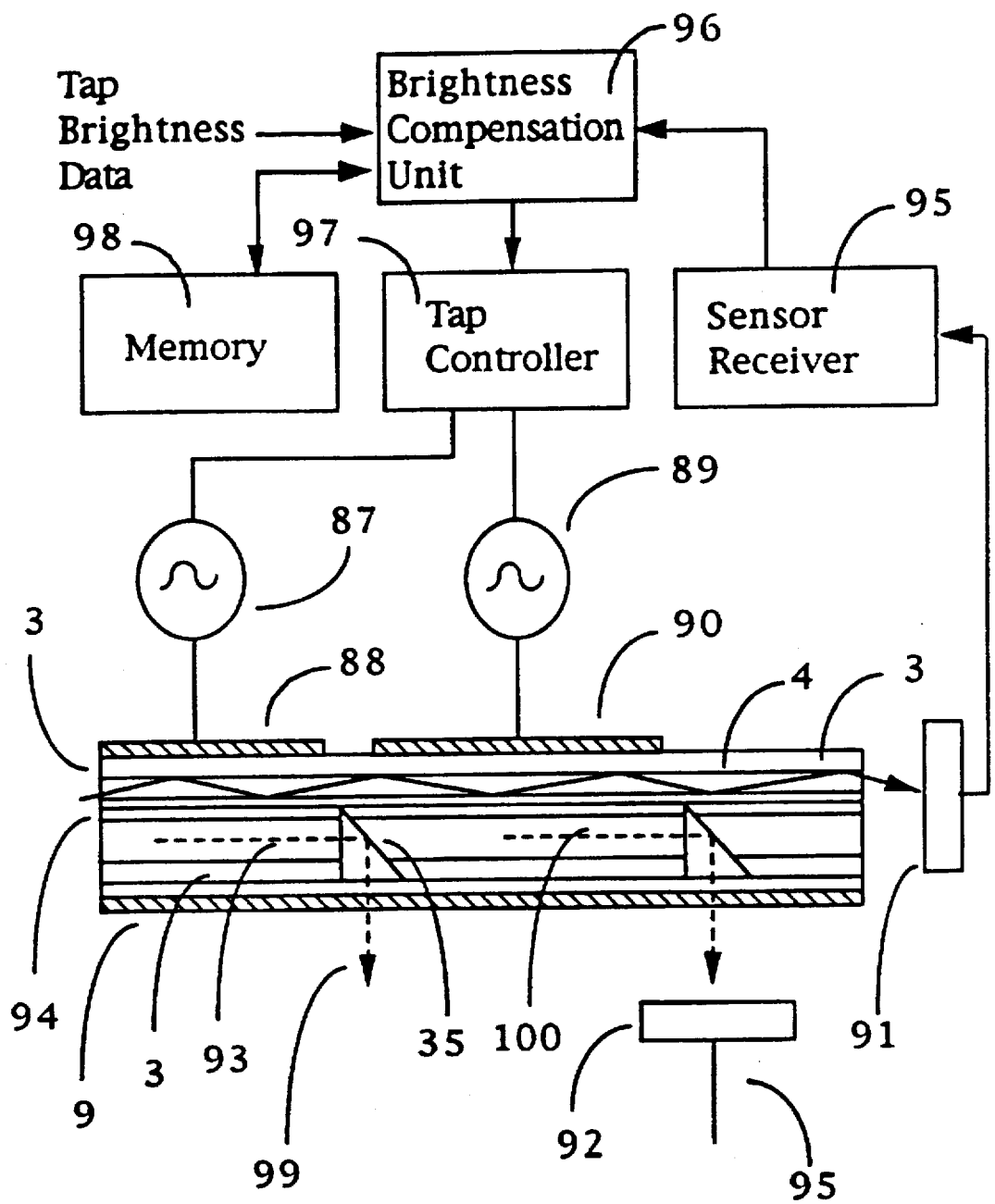
FIG. 11 is a schematic view of a feed-back system used to correct waveguide tap irregularities.

Temperature irregularities can be minimized by introducing a feed-back element into the system as shown in FIG. 11. This feed-back system measures the amount of light making it to the fiber ends with a photodetector 91 or 95. By systematically going down the length of each fiber and measuring the efficiency of each tap, for example 88 or 89, for a given applied electric field, 87 or 89, the tap efficiency can be measured. In this way the screen brightness can be dynamically compensated to provide a uniform brightness under different temperature and environmental conditions.

Figure 10:
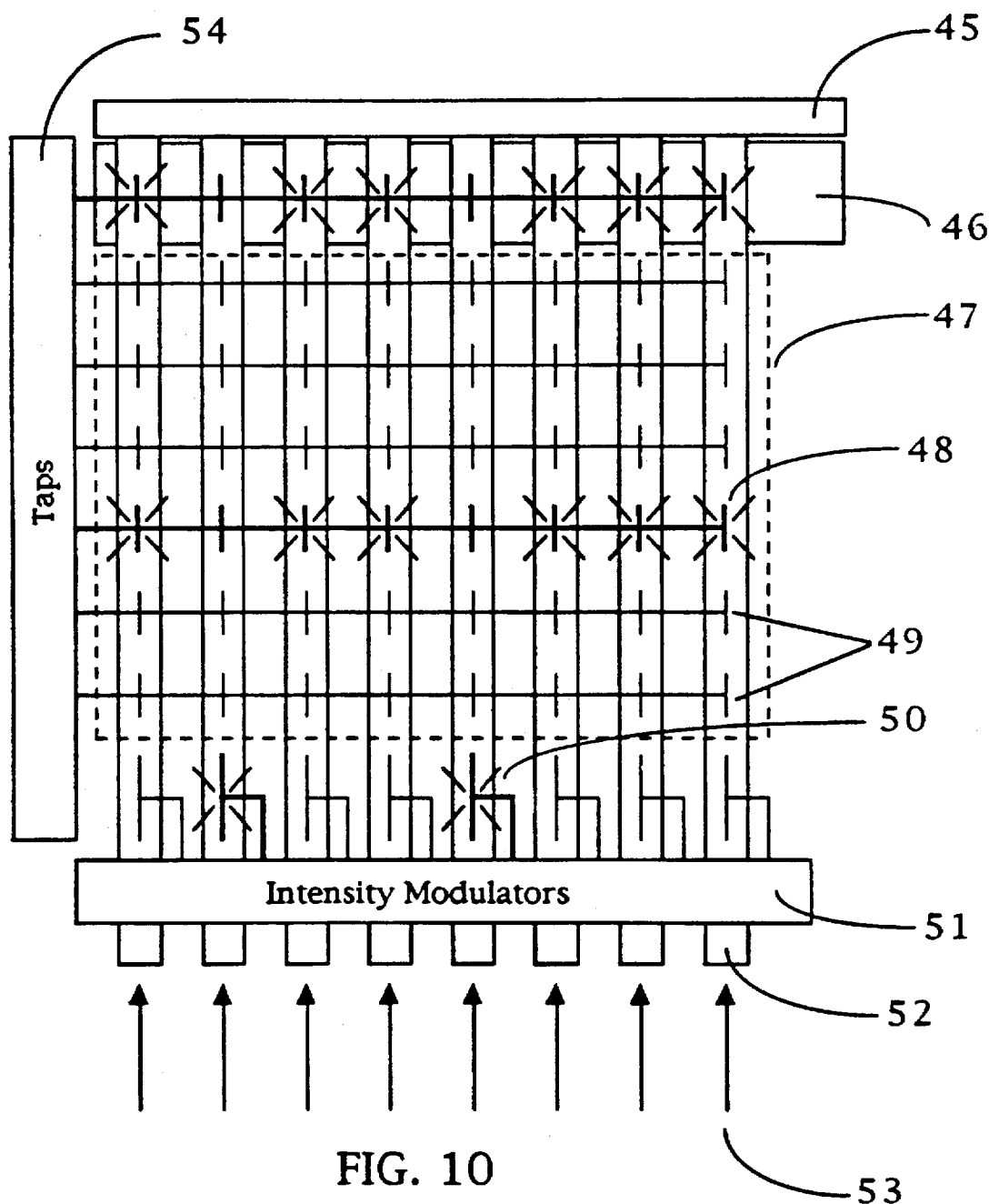
FIG. 10 is a schematic view of the control electronics used in a waveguide display system.

A single large photosensor 46 can be used to measure the output of multiple fibers in the feed-back loop as shown in FIG. 10. Alternatively, many small photosensors 91 or 95 may also be used to measure the output of individual, or small groups, of fibers in parallel. Photo sensors can be made from photodiodes. It is also possible to use pyrodetectors. For example, poled PVDF film may be laminated to the front of a waveguide ribbon to make an integrated pyroelectric sensor for detecting light intensity.

A control electronics system translates the input video signal into a set of control voltages needed to produce a screen image. The control electronics system typically works by digitizing an analog video input signal, or, buffering a digital signal. Screen information is stored in a dual port video RAM. This memory is accessed by a screen controller circuit that maps video-RAM contents in to screen brightness variations.

The screen control electronics typically sequence through all the taps 49 in the screen. A selected row of taps 48 dumps all the light out of the fiber when the voltage is lowered. The intensity modulators 58 produce the desired brightness at the selected tap row by reducing the amount of light 50 traveling through the waveguide fibers 52.

As previously mentioned there are two methods of achieving grey scales. One uses analog values to control the intensity modulators 50. The other uses the time of intensity modulator 50 activation to create grey values.

If the analog approach is used, at least one D/A converter will be needed to convert digital image information into analog voltages that are used to charge capacitors in the intensity modulator 51 drive controller. Once the gray scale information for all of the intensity modulators is locked in the capacitors, the capacitor charges are transferred, in parallel, to the gate of the driver transistors. The drive transistors connected directly to the intensity modulator electrodes 7 control the amount of light in the intensity modulators.

If intensity modulation is accomplished with length of duration of a tap switching element, then a means is needed to determine the tap activation interval. Both the analog drive approach and intensity modulation approach may use a DSP to convert a desired pixel brightness into the associated analog value or tap time duration length. DSP adjusted drive voltages are converted by a D/A converted and used by the intensity modulator controller to make an image.

Compensation for longitudinal ribbon alignment errors encountered during the manufacturing process may be necessary to make a uniform screen image. A digital buffer with ribbon offset information can be used to adjust for ribbon alignment non-uniformities.

LIGHT SOURCE & INPUT OPTICS

Most of the power is consumed in an emissive display generating light. Light generation and its efficient subsequent use is critical to lowering the amount of power used in a screen. Power consumption is especially important in large area screens; where significant illumination is needed across large surfaces.

In a waveguide display it is possible to direct upward of 80% of the light generated from the light source to the viewer. Dielectric filters enable white light to be broken into red, green, and blue components and guided across the screen in separate fibers. Since different colors of light are carried in separate waveguides, nearly all the illumination from a light source can be utilized.

This is in contrast with traditional back-lit active matrix color liquid crystal displays. These displays transmit only 5–8% of the original light from the light source to the viewer. This low efficiency causes their power consumption to be very high. The new approach of using optical waveguides to guide separate colors provides significant improvements over existing display methodologies.

Figure 15:
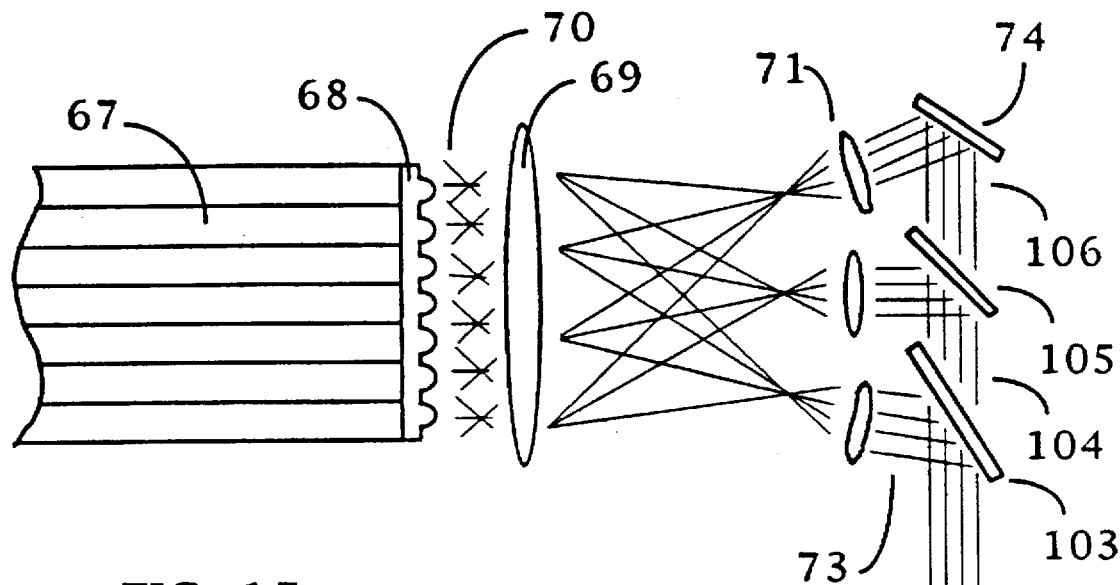
FIG. 15 is a schematic view of an efficient color display which works by separating broad-spectrum light into separate colors.
Figure 15:
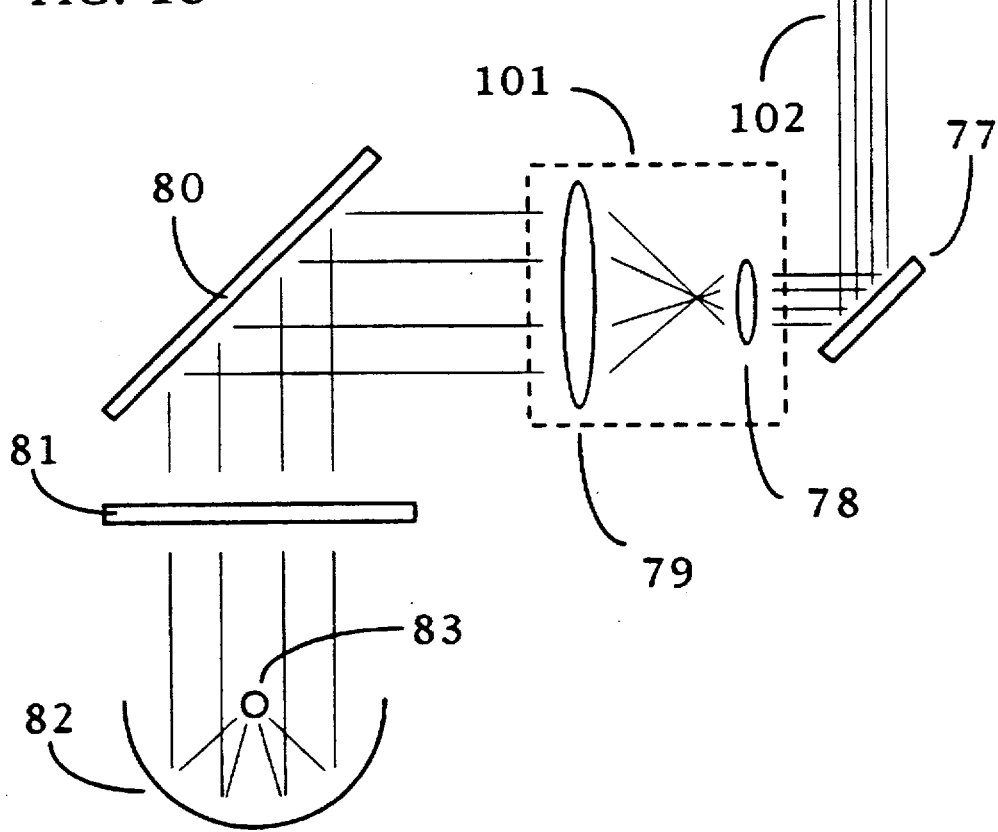

Turning to the drawings, FIG. 15 shows the light source 83. Ideally, the light source should have a high electrical/light conversion efficiency. It should also produce a well collimated beam. Beam collimation, or lack of divergence, is important to increase the efficiency of light coupled into the fiber cores. A collimated beam is more readily focused into small fiber cores with a micro-lens array. Collimated light also enables smaller refractive index changes in the electro-optic layer 5 to switch light out of the fiber core 4. Small refractive index changes translate into increased tap switching speeds since small refractive index changes are more quickly achieved in a liquid crystal material. Therefore, beam collimation directly effects the screen brightness, refresh rate and resolution.

The most promising light sources are presently quartz halogen incandescent lamps and xenon arc lamps. Quartz halogen lamps are commonly available and relatively inexpensive. However, they have poor electrical/light conversion efficiency and produce a divergent beam when compared with xenon arc lamps. Xenon arc lamps produce an extremely intense, small, arc which is readily collimated into a beam.

Xenon lamps, with integrated reflectors 82, are the preferred method of illumination for a waveguide display. An integrated reflector arc lamp is very compact, since the reflecting mirror is built into the lamp housing. ILC Corporation in Sunnyvale produces a Xenon lamp named Cermax which is ideally suited for waveguide display applications.

FIG. 15 shows how light from the lamp is processed before being focused into the fiber cores. Lamp light first passes through band-pass dielectric "hot" 81 and "cold" 80 filtering mirrors. These mirrors block infrared and ultraviolet portions of the light spectrum. Only visible light makes it to the fiber ends 67. Efficient light filtering is essential to reduce the heating and chemical bond degradation effects on sensitive plastic fiber caused by IR and UV. It may be necessary to utilize multiple "hot" 81 and "cold" 80 stage filters in series to reduce uv and IR to acceptable level. Other filter types which may be used include glass absorption filters, and water filled IR filters.

Filtered, visible light is passed through collimating and beam shaping optics 79 and 78. This collimated optical section 101 increases the uniformity and collimation of the light beam. Many different collimating techniques may be used in section 101. For example, an aperture could be used at the focal point of lens light 79 to increase the light collimation, at the expense of brightness. Or a spatial filter could be placed in the light path to increase the beam uniformity. Also, beam shaping optics may be used to produce a square beam 102, to more efficiently utilize the lamp light. The specific ordering and use of these light path elements would be clear to anyone who has designed projector illumination systems.

The filtered, collimated, visible white light 102 is passed through a series of dielectric band-pass mirrors 103 and 105. Low-pass filter 103 reflects the red portion of the light spectrum 73 and passes through the yellow and blue 104 light to filter 105. High-pass filter 105 reflects the blue portion of the light spectrum and passes through the green light 106. The remaining green light 71 is reflected by mirror 74.

Using a small, collimated, beam 102 at filtering mirrors helps reduce the size of the dielectric filters. It also allows the dielectric filters to be placed closer together and hence decreases the size of the light source optical system. Light reflected from the dielectric filters 73 is expanded by lenses 71 and 69.

Each color thus hits the micro-lens array 68 at a different angle 70. A single microlens element is used to focus the three separate primary colors into three separate fiber cores. Each color hits a shared microlens element at a different angle. Color fibers, like those shown in FIG. 2, or a closely spaced set of single core fibers like those shown in FIG. 1, receive the colors and in their fiber cores 4. Each fiber core 4 carries one color of light across the screen.

A micro-Lens arrays manufactured by Corning under the brand name SMILE may be used to focus light into the fiber end. However, SMILE lenses, since they are round, will only couple approximately 70% of the light into the fiber cores. Square microlens arrays produced by diffusion techniques can couple nearly all of the light into the fiber core since they do not loose light in the corners like round lenses. A planar graded lens can also be used in conjunction with a microlens array to focus light into the fiber ends.

Figure 16:
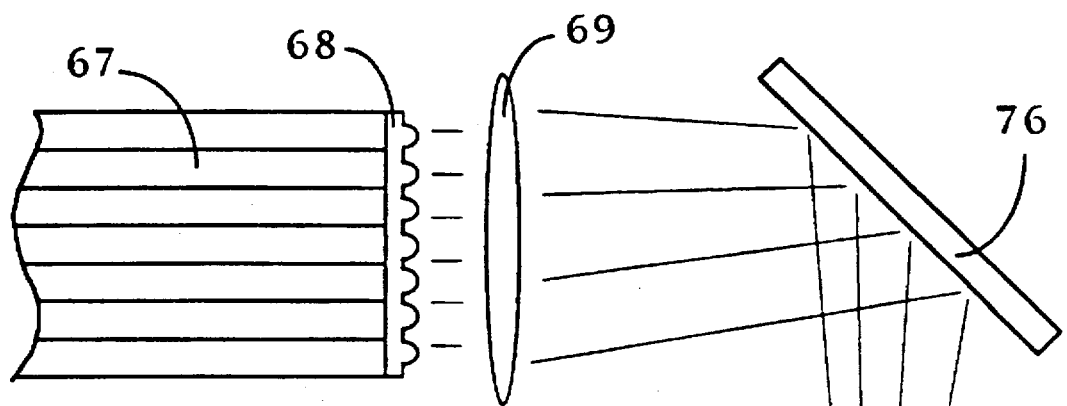
FIG. 16 is a schematic view of a rotating filter disk system used to make color images.
Figure 16:
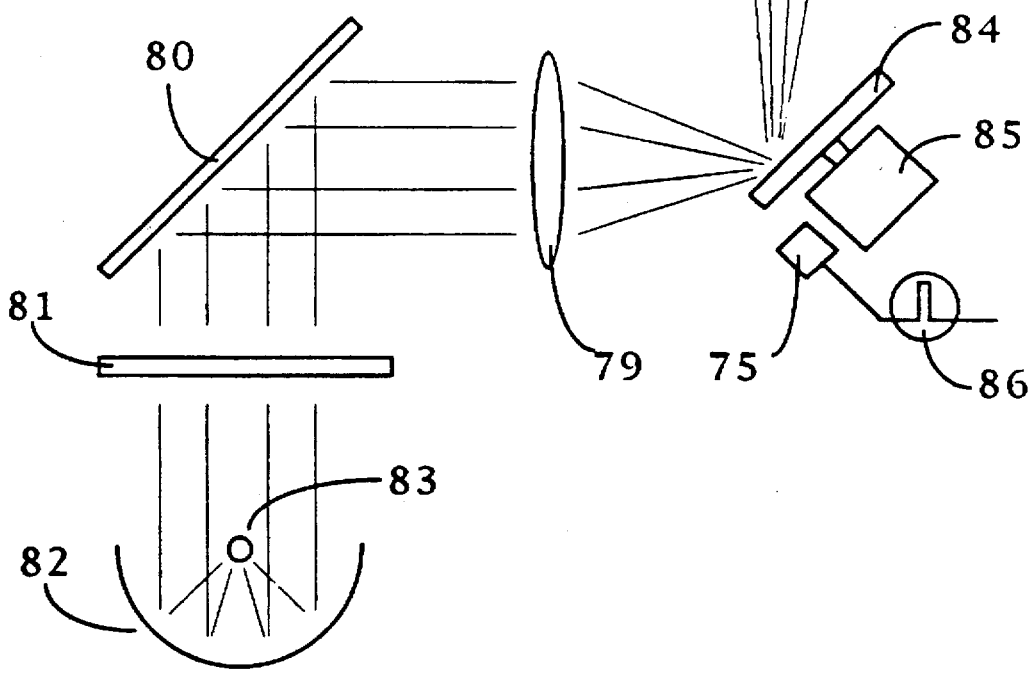
Figure 17:
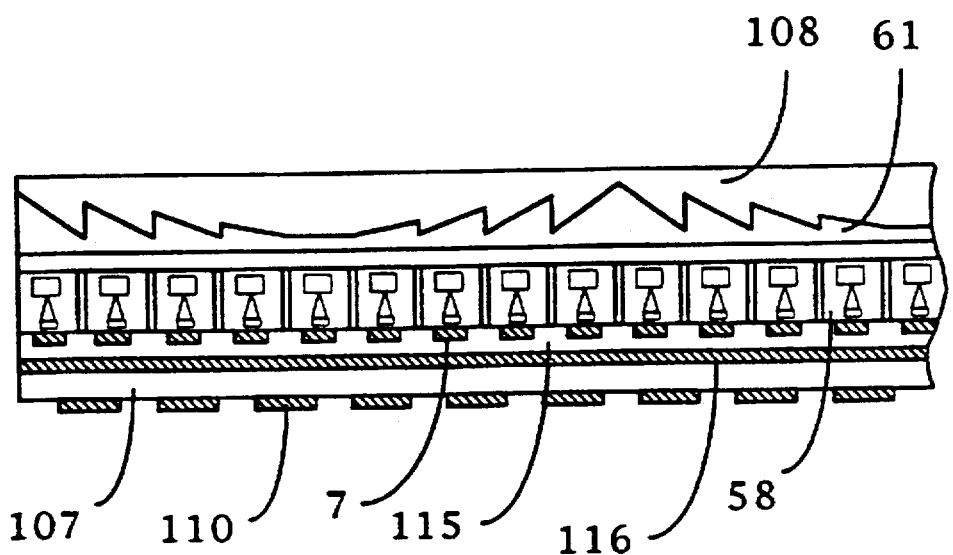
FIG. 17 shows an end view of a finished waveguide ribbon.
Figure 18:
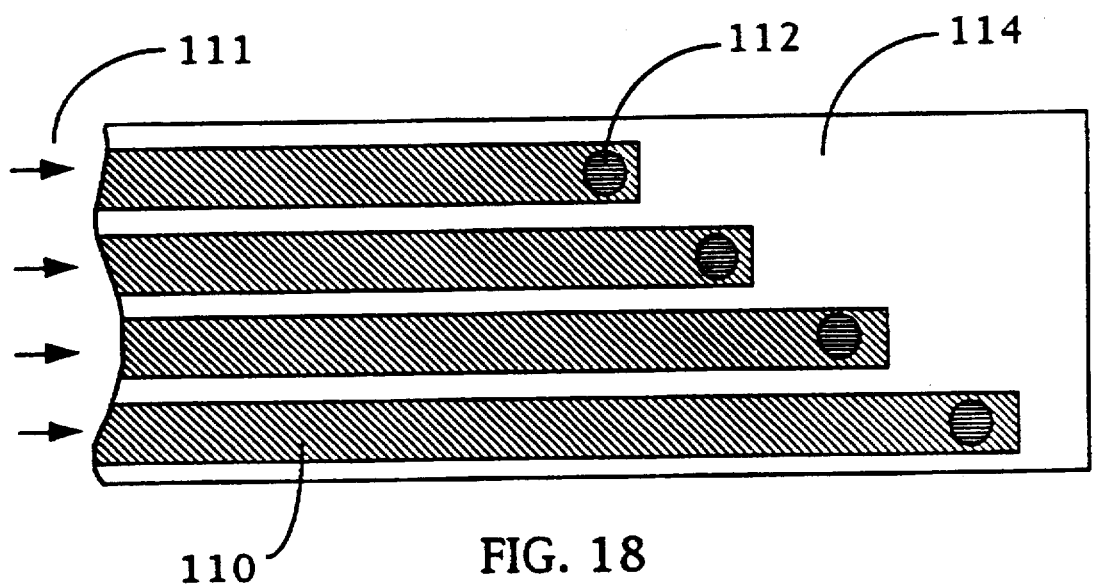
FIG. 18 is a backside view of a finished waveguide ribbon.
Figure 19:
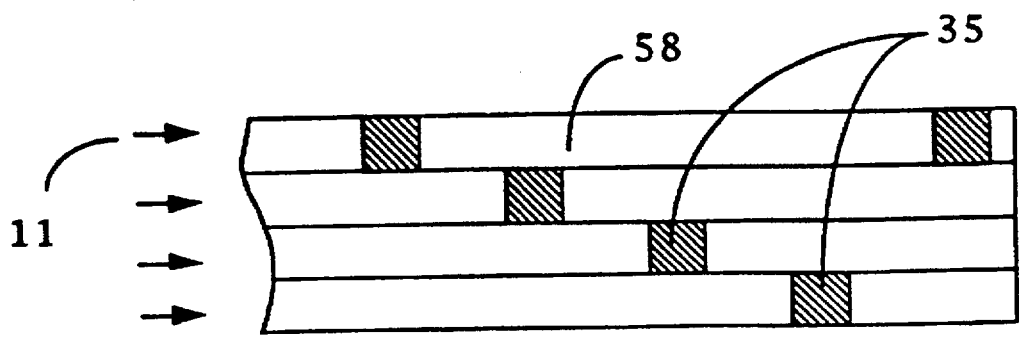
FIG. 19 is a front view of a waveguide ribbon that shows how staggered reflector pits on separate fibers enables long interaction length taps to be used and still maintain high screen resolutions.

A different method of making a color display is shown in FIG. 16. White light is focused on to a rotating disk 84 with three different color reflective dielectric filter segments. As the disk turns each segment sequentially reflects a different color into the ribbon 67 fiber cores. By sequentially painting buffered colored screen images one after another, a full color image is formed. This technique has the advantage that it utilizes extremely simple optics. Furthermore, color operation can be achieved with ⅓ the intensity modulator drive electronic connections as the three color approach in FIG. 15. Therefore, while FIG. 16 is not as light efficient as the illumination approach taught in FIG. 15, the simplification in optics and drive electronics provides useful manufacturing cost advantages.

Anti-reflective coatings are used in all optical elements in the light path. Furthermore, a fan may be needed to cool optical elements. This fan should have a filter to prevent dust and other small particles from being depositing on the optical components.

OUTPUT OPTICS

Light 59 tapped out of a fiber reflector pit 35 typically will need to pass through an output optics section before it is seen by a viewer 55. The output optics section redirects, scatters and shapes light reflected from the reflector pits 59 before it is seen by the viewer.

Separate, parallel, fibers 58 will typically be needed to make a continuous light column along the direction of light flow. Separate fibers are necessary because the tap length is too long to enable consecutive pixels to be formed on a single fiber and still maintain high screen resolutions. Consequently, consecutive pixels along the direction of light flow will be achieved by staggering long interaction length taps on separate fibers.

Unfortunately, if a single vertical column is illuminated with multiple fibers, there will be a staircase, or other irregular pattern, as a result of the horizontal shift inherent in carrying light in separate fibers. An irregular column pixel pattern along the direction of light flow can be eliminated by adjusting the light path taken by the light emitted 59 at a reflector pit 35 before it seen by a viewer.

Figure 12:
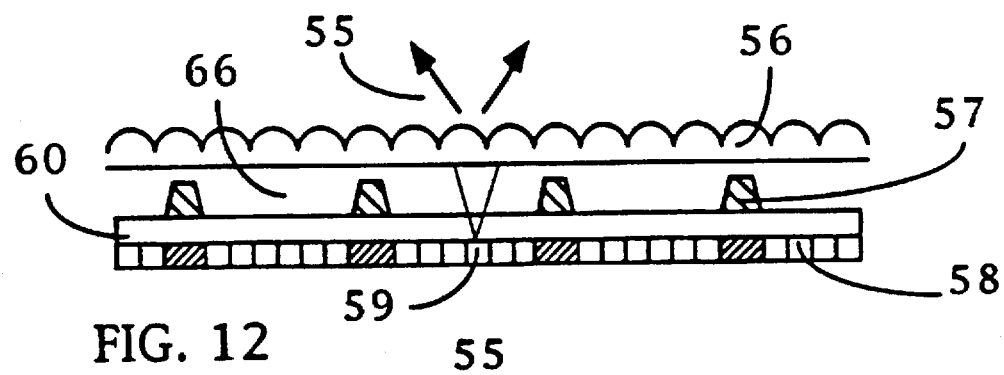
FIG. 12 is a fiber-end view of showing how light is output to the viewer through a forward scattering diffusing layer.

This adjustment can be caused by using a diffusing medium 56, a mirror 64, or lenses 61 in between the reflector pit 35 and the side of the diffusing screen the viewer sees 56. FIGS. 12–14 show how a scattering layer 56, mirror structure 64 or lenses 61 can be used to eliminate pixel non-uniformity along the length of the fibers.

FIG. 12 shows a simple forward scattering diffusing screen approach. Fibers 58 are mounted to a mounting substrate 60. Diffusing layers 66 and 56 positioned to direct light 59 from the fibers 58 to the viewer 55. Light exiting the fibers 59 first travels through optical medium 66. The optical layer 66 may be used to slightly absorb the intensity of the light 59 to keep ambient and back-scattered light from reflecting around within region 66. The film 60 or fiber 58 surface is coated with a black layer to prevent light reflected within cavity 66 from traveling long distances and causing large pixel sizes through diffusion in the cavity 66. Light exiting the fiber 59 hits the diffusing screen 56 and is scattered to the viewer 55. The ridges on the outside of layer 56 prevent surface reflections on the screen side observed by the viewer. Barriers 57 keep scattered light in a well-defined vertical column.

FIG. 13 shows a method whereby Fresnel lenses 61 are used to eliminate the horizontal multi-fiber pixel shift problem. Fresnel lens array 61 directs light 59 from each fiber to a specific area of the forward scattering diffusing screen 63 and 56. 3M makes linear Fresnel lens arrays under the name "Scotchlens" which may be used as a lens array 61. A barrier 57 like that shown in FIG. 12 could also be used with Fresnel lens approach to further define light into vertical columns.

FIG. 14 shows a method whereby mirrored reflectors are used to compensate multi-fiber horizontal shift problems. Light 59 exiting reflector pits bounces off a mirror surface 62 on reflecting structure 64 and hits the forward scattering diffusing screens 63 and/or 56. Scattered light 55 travels to the viewer and can be seen. The top of the mirrored reflecting structure 64 will typically be made of a dark material to increase the screen contrast ratio seen by the viewer.

A ridged diffusing layer 56 is commonly used in existing rear projection large screen displays. However, it is presently made out of a plastic, which is easily scratched or torn. It is desirable to make the ridged layer 56 out of a less scratch prone materials such as glass or coated plastic to prevent damage. A flat glass panel may also be placed between the ridged diffusing screen 56 and viewer to prevent damage.

WAVEGUIDE RIBBON

Multiple ribbons 114, each in turn with multiple fibers 58 mounted on it, cover a substrate to make a screen. A fiber ribbon is typically 25–100 mm wide and has square fibers ranging in size from 0.125–0.5 mm in diameter mounted on it. Metal electrodes are deposited on the back 110 of the ribbon to control the fiber taps 7 and intensity modulators electrodes 7.

In the prior art, the intensity modulator electrodes 50 run along the bottom of the screen. The tap electrodes 49 are distributed along the remaining length of the ribbon. The control electronics is shown being placed over the intensity modulators on the bottom of the ribbon.

Significant manual labor is needed to connect the taps 49 across separate ribbons in the approaches taught in the prior art. A new technique which eliminates the manual connection of tap electrodes is introduced here which is based on adding layers 115 and 107 to the back of the waveguide ribbon. These layers have vertical electrical conductors 110 and feed-through holes 112 that enable signals to control the intensity modulator 7 and tap conductors 7 from control electronics positioned at the bottom of the display.

A ground plane 116 may be positioned between the vertical ribbon control lines 110 and the electrode layer 115 and 7 to prevent the electric field of the vertical control electrodes 110 from inadvertently switching light out of the fiber taps. Feed-throughs 112 that go through the ground layer 116 connect the vertical control lines 110 to the tap control electrodes 7.

As a result of this vertical conductor 110 innovation a printed circuit board containing the control electronics may be placed over the control lines 110 at the bottom or edge of the display and control the entire screen image. Also, the waveguide ribbon 114 can be mounted on the mounting substrate with the reflector pits face up 35 from the substrate, or, face down. Depending on the screen configuration front and back ribbon orientations with respect to the substrate may be used.

COMPLETE DISPLAY

The screen controller printed circuit board (Not Shown) can be connected to the vertical control electrodes 110 with a zebra connector (Not Shown). In this connection approach the bottom of the PC board compresses a zebra connector between conductors on the bottom of the PC board and vertical control conductors 110 on the back of the ribbon 114. The PC board is pushed against the zebra connector by plates which are tightened against blocks attached to the back of the waveguide ribbon.

It is also possible to mount an integrated circuit directly on the back of the waveguide ribbon 114 (Not Shown). In this approach a control chip is bonded directly on the back of the ribbon. A protective case is placed over the flip mounted control chip to protect it during ribbon handling. Connections in the protective case enable electrical and drive signal connections to made to control the ribbon.

Self-contained ribbons using mounted control chips may be made with a clear adhesive layer deposited on the front surface 108 of the ribbon (Not Shown). This adhesive layer allows self-contained ribbons to be directly applied to large windows virtually anywhere. This will enable large screens to be made anywhere there is a window where a ribbon can be affixed to.

Separate screens can be connected together by joining them along the edges. A material with a refractive index matched to the substrate can be placed in the seems between separate screens.

The control electronic box can be curved to make the display thinner or flatter. The box can be placed above, below, behind or on the sides of a screen. The screen can be cooled by convection heating in the space between the wall and the back screen which will cause chimney affect.

RAMIFICATIONS AND CONCLUSIONS

Economical wall-size, or even theater-size, screens are possible based on the technology described in this patent. Consequently, it is important to anticipate the environmental effects large moving images will have on individuals living and working in proximity to large wall-size displays.

Dizziness, or even nausea, may be experienced by many people who stand near a large screen. The motion caused by large moving images can be very disorienting. Furthermore, the content of images displayed on a large screen will have a far greater psychological impact than the same images shown on small screens.

Taken together, these motion and psychological effects could have negative consequences for people in the vicinity of the screen. A means must be provided whereby any person near a screen can easily regain control over their environment. Specifically, a method is needed to conveniently turn a big screen off.

Impact sensors should be integrated into the screen to allow a person to hit or kick the screen and have the picture(s) being displayed change. Once the screen is hit images should shrink, disappear, or be replaced by less disturbing images. Also, a micro-phone providing speech input could be used in conjunction with a computer to enable voice input to change the screen state. A person could speak or scream the words "Go Away!" to make the screen images disappear.

These control features are felt to be important to minimize the negative consequences of this technology. It is sincerely hoped that features which enable people to turn these screens off are integrated into each and every screen by manufacture who produce them.

While this application contains many specifics, the reader should not construe these as limitations on the scope of the invention. Rather, they are merely exemplifications of the preferred embodiments. Those skilled in the art will envision many other possible variations that are apparent give the ideas presented here. Accordingly, the reader should determine the scope of the invention by the appended claims and their legal equivalents, and not solely by the examples which have been given.

I claim:

1. An optical waveguide display system comprising:
   multiple, separate, elongated, integrally formed optical waveguide elements, each substantially longer than they are wide, configured to guide light along their length and having a channel extending lengthwise within each integrally formed optical waveguide element,
   switching elements employing an electric field and placed along the length of each said separate, elongated, integrally formed optical waveguide element to allow light to be selectively removed from said separate, elongated, integrally formed optical waveguide elements and viewed, and
   liquid crystal material forming a part of said switching elements and located within each of the channels of said separate, elongated, integrally formed optical elements,
   said optical waveguide elements and liquid crystal material being formed into multiple separate monolithic fiber-like structures.

2. An optical waveguide switching element used for display purposes:
   a first elongated optical medium substantially longer than it is wide,
   a second elongated optical medium substantially longer than it is wide,
   said first and second elongated optical mediums being placed in close proximity to each other for a substantial portion of their lengths and being configured so that light is relatively free to travel without abruptly changing direction when traveling along the length of elongation of said first and second elongated optical mediums,
   a liquid crystal material placed between said first and second optical mediums configured to selectively switch light between said first and second elongated optical mediums,
   said liquid crystal material being employed to cause evanescent coupling of light between said first and second elongated optical mediums via relatively small index of refraction changes induced in said liquid crystal material by an electric field,
   said optical waveguide elements and liquid crystal material being formed into multiple separate monolithic fiber-like structures.

3. An element used in waveguide display comprising:
   a first elongated transparent optical medium that carries light;
   a switching means to couple light out of said first elongated transparent optical medium;
   a second transparent optical medium positioned alongside said first elongated transparent optical medium to receive light switched out of said first elongated optical medium via said switching means,
   said second elongated transparent optical medium having a configuration that selectively traps and guides the light switched into said second elongated transparent optical medium into an enlarged portion of said second transparent optical medium remote from said first elongated transparent optical medium via a narrowed region in said second transparent optical medium between said enlarged portion and said first elongated transparent optical medium,
   said first and second transparent optical elements being formed into multiple separate monolithic fiber-like structures.

4. An optical waveguide display system comprising:
   at least one optical waveguide with electro-optic switchable elements placed along a length of said at least one optical waveguide;
   at least one photosensor coupled to receive light from said at least one optical waveguide; and
   a control circuit coupled between said at least one photosensor and said electro-optic switchable elements to control said electro-optic switchable elements based on light sensed by said at least one photosensor.

5. The optical waveguide display system of claim 4 in which said at least one photosensor comprises multiple, separately addressable photosensors.

6. The optical waveguide display system of claim 5 in which said multiple separately addressable photosensors are coupled to either individual or groups of separate waveguide elements in a one-to-one correspondence.

7. The optical waveguide display system of claim 4 in which said control circuit compensates for refractive index irregularities caused by temperature induced refractive index changes.

8. The optical waveguide display system of claim 4 in which said control circuit adjusts for screen brightness irregularities to achieve a uniform and calibrated screen brightness profile.

9. The optical waveguide display system of claim 4 in which said at least one photosensor is placed at or near the end of said waveguides.

10. The optical waveguide display system of claim 4 in which said electro-optic switchable elements are liquid crystal switchable elements.

11. An optical waveguide display system comprising: an optical waveguide;
    an electro-optic switching layer embedded within said optical waveguide; and
    a conductive electrode element embedded within said optical waveguide in close proximity to said electro-optic switching layers,
    said electro-optic switching layer and said conductive electrode element being formed into multiple separate monolithic fiber-like structures.

* * * * *